US012774900B2

(12) United States Patent
Chan et al.

(10) Patent No.: US 12,774,900 B2
(45) Date of Patent: Oct. 27, 2026

(54) METHOD AND SYSTEM FOR LOCALISING A ROBOT USING A SCALE PLAN OF A DESIGNATED ENVIRONMENT

(71) Applicant: Agency for Science, Technology and Research, Singapore (SG)

(72) Inventors: Chee Leong Raymond Chan, Singapore (SG); Jun Li, Singapore (SG); Jian Le Chan, Singapore (SG); Zhengguo Li, Singapore (SG); Kong Wah Wan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 71 days.

(21) Appl. No.: 18/852,069

(22) PCT Filed: Mar. 29, 2023

(86) PCT No.: PCT/SG2023/050207
§ 371 (c)(1),
(2) Date: Sep. 27, 2024

(87) PCT Pub. No.: WO2023/191719
PCT Pub. Date: Oct. 5, 2023

(65) Prior Publication Data

US 2025/0207940 A1 Jun. 26, 2025

(30) Foreign Application Priority Data

Mar. 30, 2022 (SG) .......................... 10202203238W

(51) Int. Cl.
*G01C 21/00* (2006.01)
*G01C 21/30* (2006.01)
*G01S 17/89* (2020.01)

(52) U.S. Cl.
CPC ........... *G01C 21/383* (2020.08); *G01C 21/30* (2013.01); *G01S 17/89* (2013.01)

(58) Field of Classification Search
CPC .... G01C 21/383; G01C 21/30; G01C 21/005; G01C 21/206; G01S 17/89; G01S 7/4808
(Continued)

(56) References Cited

U.S. PATENT DOCUMENTS 11,774,983 B1 * 10/2023 Zhang .................. G05D 1/0253 701/28
2015/0131871 A1 * 5/2015 Chen .......................... G06T 7/11 382/113
(Continued)

OTHER PUBLICATIONS

The International Search Report (ISR) with Written Opinion for PCT/SG2023/050207 dated Aug. 28, 2023, pp. 1-6.
(Continued)

*Primary Examiner* — Krishnan Ramesh
(74) *Attorney, Agent, or Firm* — McDonnell Boehnen Hulbert & Berghoff LLP

(57) ABSTRACT

Method and system for localising a robot 100 using a scale plan of a designated environment are provided herein. In an embodiment, the method comprises: identifying reference features from the scale plan 136; generating a predicted pose 156 of the robot's current location on the scale plan 136 based on the identified reference features; scanning on-site reference features 186 of the current location; generating a map 158 for the current location to localise the robot 100, based on the scanned on-site reference features 186 of the current location and last N frames of historical scans of previous on-site reference features 186 of a plurality of locations in the designated environment that the robot traversed through before reaching the current location; the last N frames being fewer than total frames of the historical scans of the previous on-site reference features 186.

20 Claims, 19 Drawing Sheets

(a) (b) (c)

(58) Field of Classification Search
USPC .............................................................. 701/25
See application file for complete search history.

(56) References Cited

U.S. PATENT DOCUMENTS

| | | | | |
|---|---|---|---|---|
| 2018/0111274 | A1* | 4/2018 | Seok | G05D 1/0027 |
| 2019/0030719 | A1* | 1/2019 | Dey | B25J 9/1682 |
| 2020/0327367 | A1* | 10/2020 | Ma | G06N 3/0464 |
| 2020/0386555 | A1* | 12/2020 | Schroeter | G01S 17/931 |
| 2021/0008730 | A1* | 1/2021 | Hu | B25J 13/089 |
| 2021/0310962 | A1* | 10/2021 | Oetiker | G05D 1/024 |
| 2022/0095871 | A1* | 3/2022 | Jakhotia | G05D 1/244 |
| 2022/0307859 | A1* | 9/2022 | Zou | G01C 21/3848 |
| 2023/0010105 | A1* | 1/2023 | Ha | B25J 9/162 |
| 2023/0236608 | A1* | 7/2023 | Cheah | G06V 20/176<br>701/25 |

OTHER PUBLICATIONS

Boniardi, F. et al. "Robust LiDAR-based Localization in Architectural Floor Plans" IEEE/RSJ International Conference on Intelligent Robots and Systems (IROS) 2017, pp. 1-7. [Retrieved on Aug. 22, 2023] <DOI: 10.1109/IROS.2017.8206168>.

Chan C. L. et al. "Partial-Map-Based Monte Carlo Localization in Architectural Floor Plans". Social Robotics. /CSR 2021. Lecture Notes in Computer Science, Nov. 2, 2021, vol. 13086, pp. 541-552. [Retrieved on Aug. 24, 2023] <DOI: 10.1007/978-3-030-90525-5_47>.

Gao L. et al. "FP-Loc: Lightweight and Drift-free Floor Plan-assisted LiDAR Localization" 2022 IEEE International Conference on Robotics and Automation (ICRA) May 23-27, 2022. https://arxiv.org/abs/2203.00292, Mar. 1, 2022, pp. 1-7 [Retrieved on Aug. 24, 2023] <DOI: 10.48550/ARXIV.2203.00292>.

* cited by examiner

278

280

282

(a) (b)

METHOD AND SYSTEM FOR LOCALISING A ROBOT USING A SCALE PLAN OF A DESIGNATED ENVIRONMENT

This application is a U.S. national phase of International Application No. PCT/SG2023/050207, filed on Mar. 29, 2023, which claims priority to Singapore Patent Application No. 10202203238 W, filed Mar. 30, 2022, both of which are incorporated by reference herein in their entirety.

FIELD

The invention relates to a method and system for localising a robot using a scale plan of a designated environment.

BACKGROUND

As industries move forward towards Industry 4.0, automation is preferred over human involvement. As a result, using an autonomous mobile robot (AMR) is widely regarded as one of the most feasible solutions. An important aspect of AMR is robot localisation. Mobile robots, in modern technology, demand a more robust localization in a complex environment, such as when maneuvering within designated or confined environment such as a building. However, existing methods do not perform satisfactorily in such environments.

It is an object of the present invention to address problems of the prior art and/or to provide the public with a useful choice.

SUMMARY

According to a first aspect of the present invention, there is provided a method of localising a robot using a scale plan of a designated environment, the method comprises: identifying reference features from the scale plan; generating a predicted pose of the robot's current location on the scale plan based on the identified reference features; scanning on-site reference features of the current location; and generating a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features.

As described in the preferred embodiment, by constructing the map using the current scan and the last N frames of historical scans of previous on-site reference features, the need of storing and processing historical scans older than the last N frame may be avoided, which may result in localising on a globally inconsistent but locally consistent map and hence the localised pose of the robot may fit nicely to the scale plan. Besides maintaining accuracy of local consistency of the generated map, this may also help to reduce computational cost and accumulated errors on mapping. As the last N frames are fewer than the total frames of historical scans, even if the scale plan has one or more regions that have inaccurate scale, the generated map may still be able to align the robot to the scale plan regions with inaccurate scale, which may improve the reliability of the localisation.

In an embodiment, the method may further comprise calculating a weight for the predicted pose based on the generated map and the scale plan. It is envisaged that the calculated weight may be used to update the predicted pose of the robot.

In an embodiment, the method may further comprise converting the scale plan to a first gradient direction map and converting the generated map to a second gradient direction map for calculating the weight for the predicted pose, wherein the first gradient direction map includes a first gradient direction representing a respective reference normal direction of surface to each reference feature identified on the scale plan and the second gradient direction map includes a second gradient direction representing a respective on-site normal direction of a surface to each on-site reference feature scanned at the current location. The gradient direction maps may help to address multiple local maxima caused by wall layout of the floor plan due to that wall layout in the floor plan shows two parallel lines of the occupied cells representing front and rear surfaces of walls, where the front surfaces are visible by robot's observation while the rear surfaces are not.

In an embodiment, the method may further comprise converting the scale plan to a gradient magnitude map for calculating the weight for the predicted pose, wherein the gradient magnitude map includes a gradient of magnitude representing a respective distribution for each reference feature identified on the scale plan, with a centre of each identified reference feature carrying a higher magnitude value than an edge of the respective identified reference feature. By generating the gradient magnitude map, the accuracy of localization may be maintained even when scale of the floor plan is slightly different from actual condition.

It is envisaged that the predicted pose may comprise a plurality of particles, each representing a potential location of the robot associated with a respective particle weight. It is also envisaged that calculating the weight for the predicted pose may comprise calculating the particle weight for each of the plurality of particles. In an embodiment, the particle weight for at least one of the plurality of particles may be calculated to be proportional to the magnitude value of a corresponding cell in the gradient magnitude map. Calculating particle weight to be proportional to the magnitude value may help to reflect the distribution of the occupied cells on the calculated weights, so that the robot may still be localised even if scale of the floor plan is slightly off (e.g. discrepancy exists in the floor plan, or minor mismatch between the scale of the floor plan and the structure sensed from the environment).

In an embodiment, the generated map may comprise a sensed pose of the robot and the scanned on-site reference features of the current location comprise a fixed or immovable object of the designated environment, the particle weight for at least one of the plurality of particles is calculated to be inverse proportional to a distance between the sensed pose and the fixed or immovable object. Calculating the particle weight to be inverse proportional to the distance between the sensed pose and the fixed or immovable object may help to prevent the robot from drifting away from the true pose because of high accumulated error from the historical frames of scans that were matched to discrepancy of the floor plan resulting in neglecting the matching of the occupied cell that is near to robot's pose in the PSLAM map.

In an embodiment, the N may be chosen from a range from 50 to 150, or from 60 to 140, or from 70 to 130, or from 80 to 120, or from 90 to 110. Indeed, N may be any number in these ranges. It is envisaged that the scanned on-site reference features of the current location may be stored as a latest frame of historical scans for generating the map when the robot traverses to a next location from the current location. It is envisaged that two neighbouring frames of the last N frames of historical scans may share an overlap of on-site reference features.

According to a second aspect of the present invention, there is provided a system for localising a robot using a scale plan of a designated environment, comprising: a sensor module configured to detect on-site reference features and a processor; the processor is configured to: identify reference features from the scale plan; generate a predicted pose of the robot's current location on the scale plan based on the identified reference features; scan on-site reference features of the current location; and generate a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features.

The processor of the system constructs the map using the current scan and the last N frames of historical scans of previous on-site reference features, so that the system may avoid the need of storing and processing historical scans older than the last N frame, which may result in localising on a globally inconsistent but locally consistent map and hence the localised pose of the robot may fit nicely to the scale plan. Besides maintaining accuracy of local consistency of the generated map, the processor using such method may also help the system to reduce computational cost and accumulated errors on mapping. Although the last N frames are fewer than the total frames of historical scans, the map generated from these frames still covers a relative large area. Hence even if the scale plan has one or more smaller regions that have inaccurate scale, the generated map may still be able to help the system to align the robot to the scale plan regions with inaccurate scale, which may improve the reliability of the localisation.

In an embodiment, the processor may be configured to further calculate a weight for the predicted pose based on the generated map and the scale plan. It is envisaged that the calculated weight may be used to update the predicted pose of the robot.

In an embodiment, the processor may be configured to further convert the scale plan to a first gradient direction map and convert the generated map to a second gradient direction map for calculating the weight for the predicted pose, wherein the first gradient direction map includes a first gradient direction representing a respective reference normal direction of surface to each reference feature identified on the scale plan and the second gradient direction map includes a second gradient direction representing a respective on-site normal direction of a surface to each on-site reference feature scanned at the current location. The system may use the gradient direction maps to address issues like multiple local maxima that may be caused by wall layout of the floor plan due to that wall layout occupied cells in the floor plan shows two parallel lines representing front and rear surfaces of the walls, where the front surfaces are visible to robot's observation while the rear surfaces are not.

In an embodiment, the processor may be configured to further convert the scale plan to a gradient magnitude map for calculating the weight for the predicted pose, wherein the gradient magnitude map includes a gradient of magnitude representing a respective distribution for each reference feature identified on the scale plan, with a centre of each identified reference feature carrying a higher magnitude value than an edge of the respective identified reference feature. The processor of the system, by generating the gradient magnitude map, may help to maintain the accuracy of localisation of the robot even when scale of the floor plan is slightly different from actual condition.

It is envisaged that the predicted pose may comprise a plurality of particles, each representing a potential location of the robot associated with a respective particle weight. In an embodiment, calculating the weight for the predicted pose may comprise calculating the particle weight for each of the plurality of particles. In an embodiment, wherein the particle weight for at least one of the plurality of particles may be calculated to be proportional to the magnitude value of a corresponding cell in the gradient magnitude map. The processor of the system, by calculating particle weight to be proportional to the magnitude value of a corresponding cell, may help to reflect the distribution of the occupied cells in the calculated weights, so that the system may still localise the robot even if the scale of the floor plan is slightly off (e.g. discrepancy in the floor plan, or minor mismatch between the scale of the floor plan and the structure sensed from the environment).

In an embodiment, the generated map may comprise a sensed pose of the robot and the scanned on-site reference features of the current location comprise a fixed or immovable object of the designated environment, the particle weight for at least one of the plurality of particles is calculated to be inverse proportional to a distance between the sensed pose and the fixed or immovable object. The processor of the system, by calculating the particle weight to be inverse proportional to a distance between the sensed pose and the fixed or immovable object may help the system in preventing the robot from drifting away from the true pose; such drift may be due to high accumulated error from the historical frames of scans that were matched to discrepancy of the floor plan resulting in neglecting the matching of the occupied cell that is near to robot's pose in the PSLAM map.

In an embodiment, the N may be chosen from a range from 50 to 150. It is envisaged that the processor may store the scanned on-site reference features of the current location as a latest frame of historical scans for generating the map when the robot traverses to a next location from the current location. It is envisaged that two neighbouring frames of the last N frames of historical scans may share an overlap of on-site reference features.

According to a third aspect of the present invention, there is provided a robot, comprising a system, and a controller configured to control an operation of the robot in a designated environment based on a localisation result provided by the system; the system comprises: a sensor module configured to detect on-site reference features and a processor; the processor is configured to: identify reference features from the scale plan; generate a predicted pose of the robot's current location on the scale plan based on the identified reference features; scan on-site reference features of the current location; and generate a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features.

According to a fourth aspect of the present invention, there is provided a non-transitory computer-readable storage medium for storing a computer program, when executed by a processor, performs a method of localising a robot in a designated environment, comprises: identifying reference features from the scale plan; generating a predicted pose of the robot's current location on the scale plan based on the identified reference features; scanning on-site reference features of the current location; generating a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features.

BRIEF DESCRIPTION OF THE DRAWINGS

In the following, an embodiment of the present invention including the figures will be described as non-limiting examples with reference to the accompanying drawings in which.

DETAILED DESCRIPTION

According to an embodiment of the present invention, a method of localising a robot on a scale plan of a designated environment and a localisation system for performing the method are provided. As will be described in detail below, the localisation is based on a scale plan. Reference features are identified from the scale plan for generating a predicted pose of the robot. On-site reference features of the robot's current location are scanned for constructing a map of the real environment. The construction of the map is based on the scanning result of the robot's current location and last N frames of historical scans of previous on-site reference features of a plurality of locations that the robot traversed through before reaching the current location, the last N frames being fewer than total frames of the historical scans of the previous on-site reference features.

Figure 1:
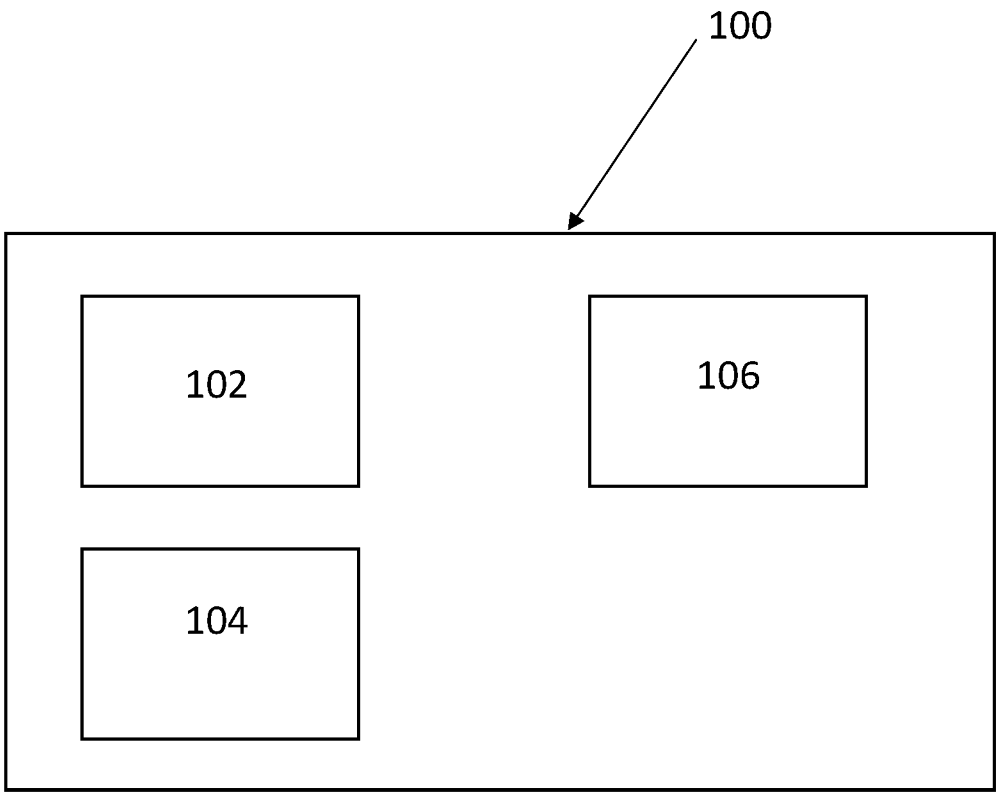
FIG. 1 is a simplified functional block diagram of a robot according to an embodiment of the present invention comprising a localisation system.

FIG. 1 depicts a simplified functional block diagram of the robot 100 according to the described embodiment. The robot 100 includes a sensor module 102 comprising at least a sensor for detecting information of an environment where the robot 100 locates, a localisation system 104 configured to provide information for localising the robot 100, and a controller 106 configured to control an operation of the robot 100 taking into account of the information provided by the localisation system 104.

The controller 106 may comprise computing devices and a plurality of sub-systems (not shown) for controlling specific aspects of movement of the robot 100 including but not limited to a deceleration system, an acceleration system and a steering system. Certain of these sub-systems may comprise one or more actuators, for example the deceleration system may comprise brakes, the acceleration system may comprise an accelerator pedal, and the steering system may comprise a steering wheel or other actuator to control the angle of turn of wheels of the robot 100, etc.

Figure 2:
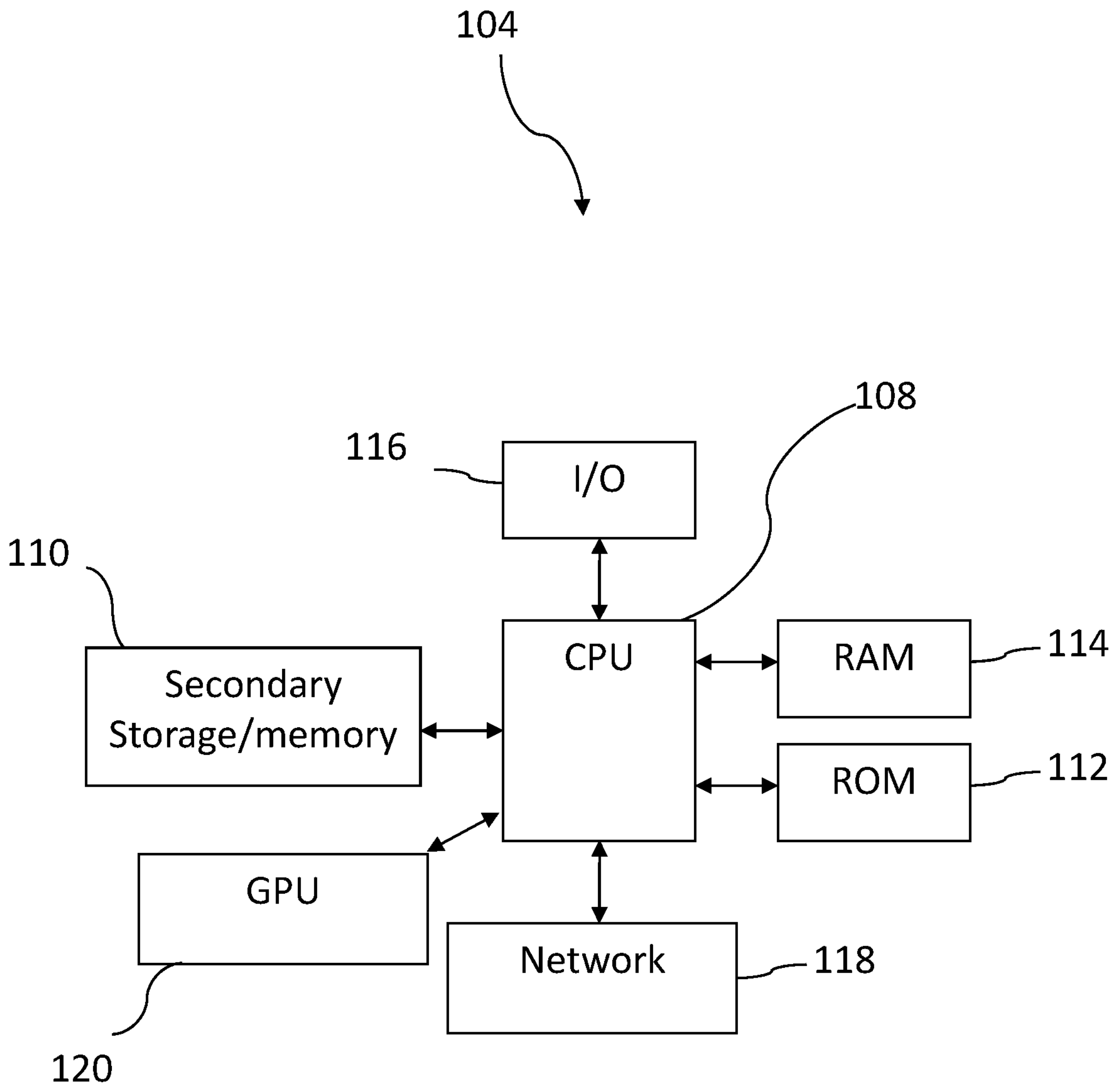
FIG. 2 illustrates a block diagram of the localisation system of FIG. 1.

FIG. 2 illustrates the block diagram of the localisation system 104. The localisation system 104 includes a processor 108 (which may be referred to as a central processor unit or CPU) that is in communication with memory devices including a secondary storage 110, a read only memory (ROM) 112, a random access memory (RAM) 114, an input/output (I/O) devices 116, a network connectivity devices 118 and a graphics processing unit (GPU) 120, for example a mini GPU. The processor 108 and/or GPU 120 may be implemented as one or more CPU chips. The GPU 120 may be embedded alongside the processor 108 or it may be a discrete unit, as shown in FIG. 2.

It is understood that by programming and/or loading executable instructions onto the localisation system 104, at least one of the CPU 108, the RAM 114, the ROM 112 and the GPU 120 are changed, transforming the localisation system 104 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the localisation system 104 is turned on or booted, the CPU 108 and/or GPU 120 may execute a computer program or application. For example, the CPU 108 and/or GPU 120 may execute software or firmware stored in the ROM 112 or stored in the RAM 114. In some cases, on boot and/or when the application is initiated, the CPU 108 and/or GPU 120 may copy the application or portions of the application from the secondary storage 110 to the RAM 114 or to memory space within the CPU 108 and/or GPU 120 itself, and the CPU 108 and/or GPU 120 may then execute instructions that the application is comprised of. In some cases, the CPU 108 and/or GPU 120 may copy the application or portions of the application from memory accessed via the network connectivity devices 118 or via the I/O devices 116 to the RAM 114 or to memory space within the CPU 108 and/or GPU 120, and the CPU 108 and/or GPU 120 may then execute instructions that the application is comprised of. During execution, an application may load instructions into the CPU 108 and/or GPU 120, for example load some of the instructions of the application into a cache of the CPU 108 and/or GPU 120. In some contexts, an application that is executed may be said to configure the CPU 108 and/or GPU 120 to do something, e.g., to configure the CPU 108 and/or GPU 120 to perform the localisation according to the described embodiment. When the CPU 108 and/or GPU 120 is configured in this way by the application, the CPU 108 and/or GPU 120 becomes a specific purpose computer or a specific purpose machine.

The secondary storage 110 may comprise one or more disk drives or tape drives and is used for non-volatile storage of data and as an over-flow data storage device if the RAM 114 is not large enough to hold all working data. The secondary storage 110 may be used to store programs which are loaded into the RAM 114 when such programs are selected for execution. The ROM 112 is used to store instructions and perhaps data which are read during program execution. The ROM 112 is a non-volatile memory device which typically has a small memory capacity relative to the larger memory capacity of the secondary storage 110. The RAM 114 is used to store volatile data and perhaps to store instructions. Access to both the ROM 112 and the RAM 114 is typically faster than to the secondary storage 110. The secondary storage 110, the RAM 114, and/or the ROM 112 may be referred to in some contexts as computer readable storage media and/or non-transitory computer readable media.

The I/O devices 116 may include a wireless or wired connection to the sensor module 102 for receiving data from the sensor module 102 and/or a wireless or wired connection to the controller 106 for transmitting information, such as a path plan, so that the controller 106 may control operation of the robot 100 accordingly. The I/O devices 116 may alternatively or additionally include electronic displays such as video monitors, liquid crystal displays (LCDs), plasma displays, touch screen displays, or other well-known output devices.

The network connectivity devices 118 may enable a wireless connection to facilitate communication with other computing devices such as components of the robot 100, for example the sensor module 102 and/or controller 106 or with other computing devices not part of the robot 100. The network connectivity devices 118 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. The network connectivity devices 118 may enable the processor 108 and/or GPU 120 to communicate with the Internet or one or more intranets. With such a network connection, it is contemplated that the processor 108 and/or GPU 120 might receive information from the network, or might output information to the network in the course of performing a localisation method according to the described embodiment. Such information, which is often represented as a sequence of instructions to be executed using the processor 108 and/or GPU 120, may be received from and outputted to the network, for example, in the form of a computer data signal embodied in a carrier wave.

Such information, which may include data or instructions to be executed using the processor 108 and/or GPU 120 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 108 and/or GPU 120 executes instructions, codes, computer programs, scripts which it accesses from hard disk, floppy disk, optical disk (these various disk-based systems may all be considered the secondary storage 110), flash drive, the ROM 112, the RAM 114, or the network connectivity devices 118. While only one processor 108 and GPU 120 are shown, multiple processors may be present. Thus, while instructions may be discussed as executed by one processor 108, the instructions may be executed simultaneously, serially, or otherwise executed by one or multiple processors. Instructions, codes, computer programs, scripts, and/or data that may be accessed from the secondary storage 110, for example, hard drives, floppy disks, optical disks, and/or other device, the ROM 112, and/or the RAM 114 may be referred to in some contexts as non-transitory instructions and/or non-transitory information.

In an embodiment, the localisation system 104 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the localisation system 104 to provide the functionality of a number of servers that is not directly bound to the number of computers in the localisation system 104. For example, virtualization software may provide twenty virtual servers on four physical computers. In an embodiment, the functionality according to the described embodiment may be provided by executing the application and/or applications in a cloud computing environment. Cloud computing may comprise providing computing services via a network connection using dynamically scalable computing resources.

Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality of the described embodiment may be provided as a computer program product. The computer program product may comprise one or more computer readable storage medium having computer usable program code embodied therein to implement the functionality according to the described embodiment. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analogue magnetic tape, compact disk read only memory (CD-ROM) disks, floppy disks, jump drives, digital cards, multimedia cards, and others. The computer program product may be suitable for loading, by the localisation system 104, at least portions of the contents of the computer program product to the secondary storage 110, to the ROM 112, to the RAM 114, and/or to other non-volatile memory and volatile memory of the localisation system 104. The processor 108 and/or GPU 120 may process the executable instructions and/or data structures in part by directly accessing the computer program product, for example by reading from a CD-ROM disk inserted into a disk drive peripheral of the localisation system 104. Alternatively, the processor 108 and/or GPU 120 may process the executable instructions and/or data structures by remotely accessing the computer program product, for example by downloading the executable instructions and/or data structures from a remote server through the network connectivity devices 118. The computer program product may comprise instructions that promote the loading and/or copying of data, data structures, files, and/or executable instructions to the secondary storage 110, to the ROM 112, to the RAM 114, and/or to other non-volatile memory and volatile memory of the localisation system 104.

In some contexts, the secondary storage 110, the ROM 112, and the RAM 114 may be referred to as a non-transitory computer readable medium or a computer readable storage media. A dynamic RAM embodiment of the RAM 114, likewise, may be referred to as a non-transitory computer readable medium in that while the dynamic RAM receives electrical power and is operated in accordance with its design, for example during a period of time during which the localisation system 104 is turned on and operational, the dynamic RAM stores information that is written to it. Similarly, the processor 108 and/or GPU 120 may comprise an internal RAM, an internal ROM, a cache memory, and/or other internal non-transitory storage blocks, sections, or components that may be referred to in some contexts as non-transitory computer readable media or computer readable storage media.

For localising the robot 100 in a designated environment, the localisation system 104 is configured to perform a method of localising the robot 100 in the designated or confined environment based on a scale plan of the designated environment. A scale plan of a designated or confined environment refers to a pre-existing map, plan or drawing drawn to scale and shows a layout of the designated environment. The layout is usually illustrated in plan view (i.e. view from the above) and includes at least certain information (e.g. fixed or immovable objects) of the environment, such as features of structures in an indoor environment, features of fixed regions/areas in an outdoor environment. For an indoor environment, a floor plan 136 (see FIG. 4(*a*)) is a type of scale plan which illustrates the layout of a building, and the layout may include different layers to represent respective floors of the building. The floor plan 136 may include structural information of the floor (e.g. locations of permanent structures such as walls, windows, doors and stairs, and semi-permanent structures such as fixtures). For an outdoor environment, an area plan and a site plan are two types of scale plan, which may illustrate the boundaries and functions of certain areas in the outdoor environment. For example, Google™ map or OpenStreetMap™ are typical outdoor scale maps. For any target area or environment, regional outdoor scale plans may be extracted from such outdoor scale maps, such as, residential areas, school campus etc. Although a scale plan may not necessarily include precise measurement everywhere in an environment, and there may be discrepancies between scale plans and real environment, scale plans may be used for localisation in a designated environment.

Figure 3:
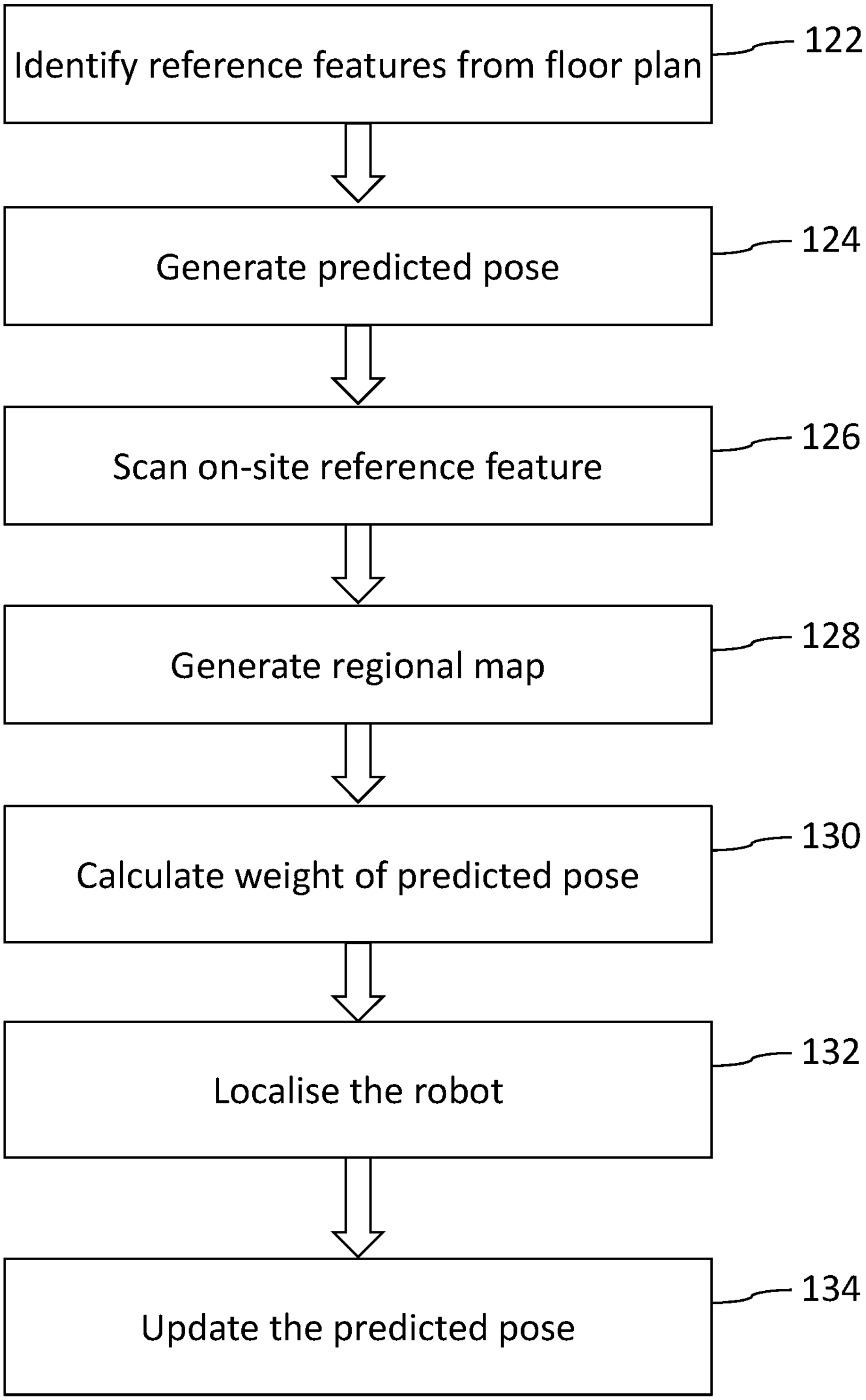
FIG. 3 illustrates a localisation method performed by the localisation system of FIG. 1.

FIG. 3 illustrates an exemplary method of localising the robot 100 in the designated or confined environment and in this embodiment, the designated environment is a building (as an example of an indoor environment) and the scale plan is the floor plan 136 of the building. The method based on the floor plan 136 of the building is executed by the processor 108 and/or GPU 120 of the localisation system 104. The method, comprising steps 122 to 134, is performed in real time when the robot 100 is in motion to support navigation and control of the robot 100.

Figure 4A:
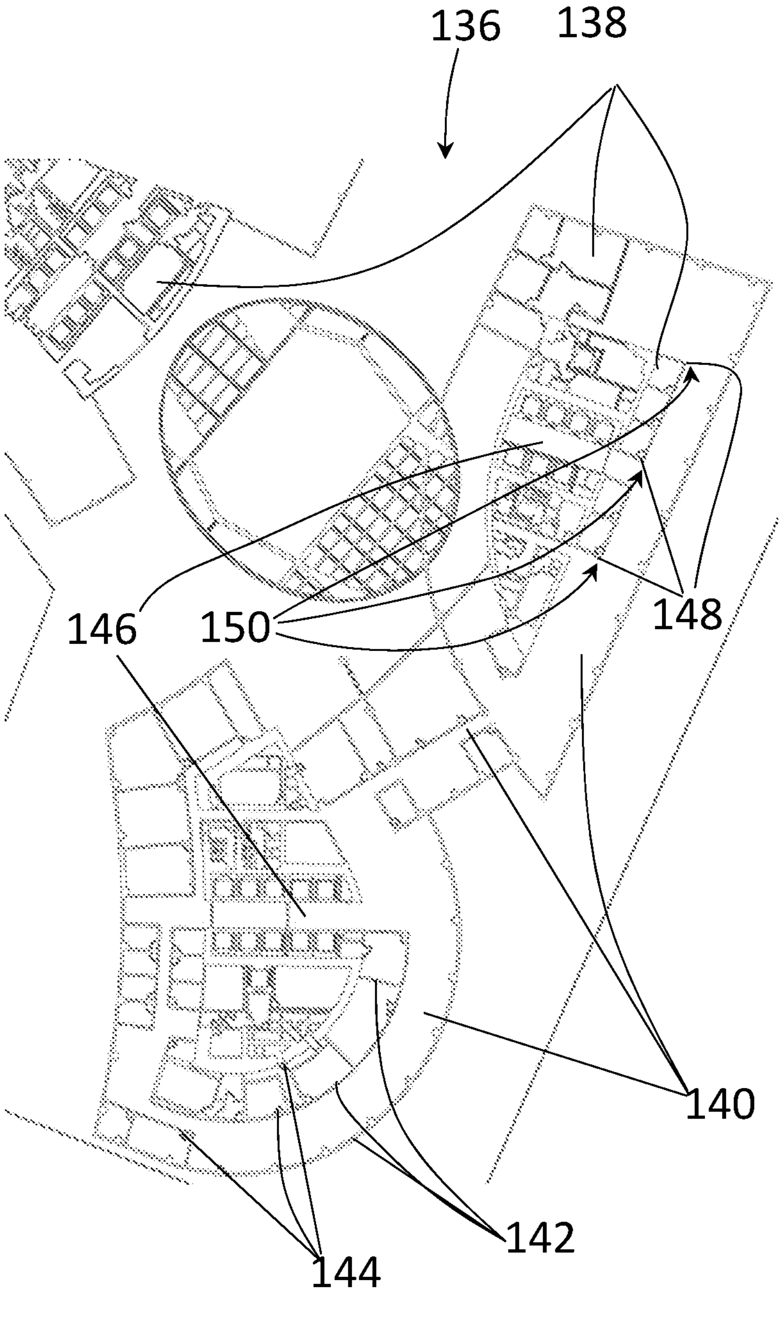
FIGS. 4(*a*)-(*c*) illustrate a flow plan and pre-processing of the floor plan for use in the method of FIG. 3.
Figure 4B:
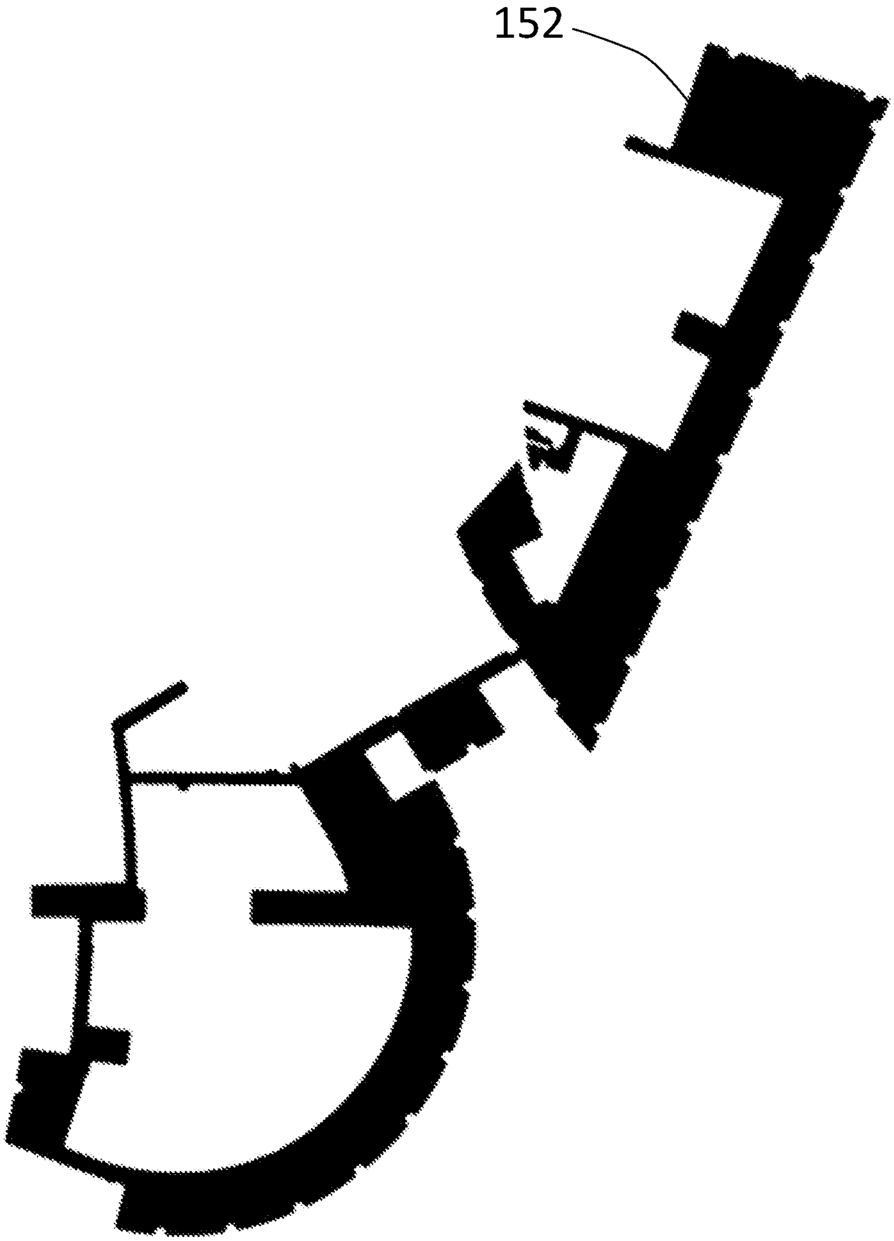
Figure 4C:
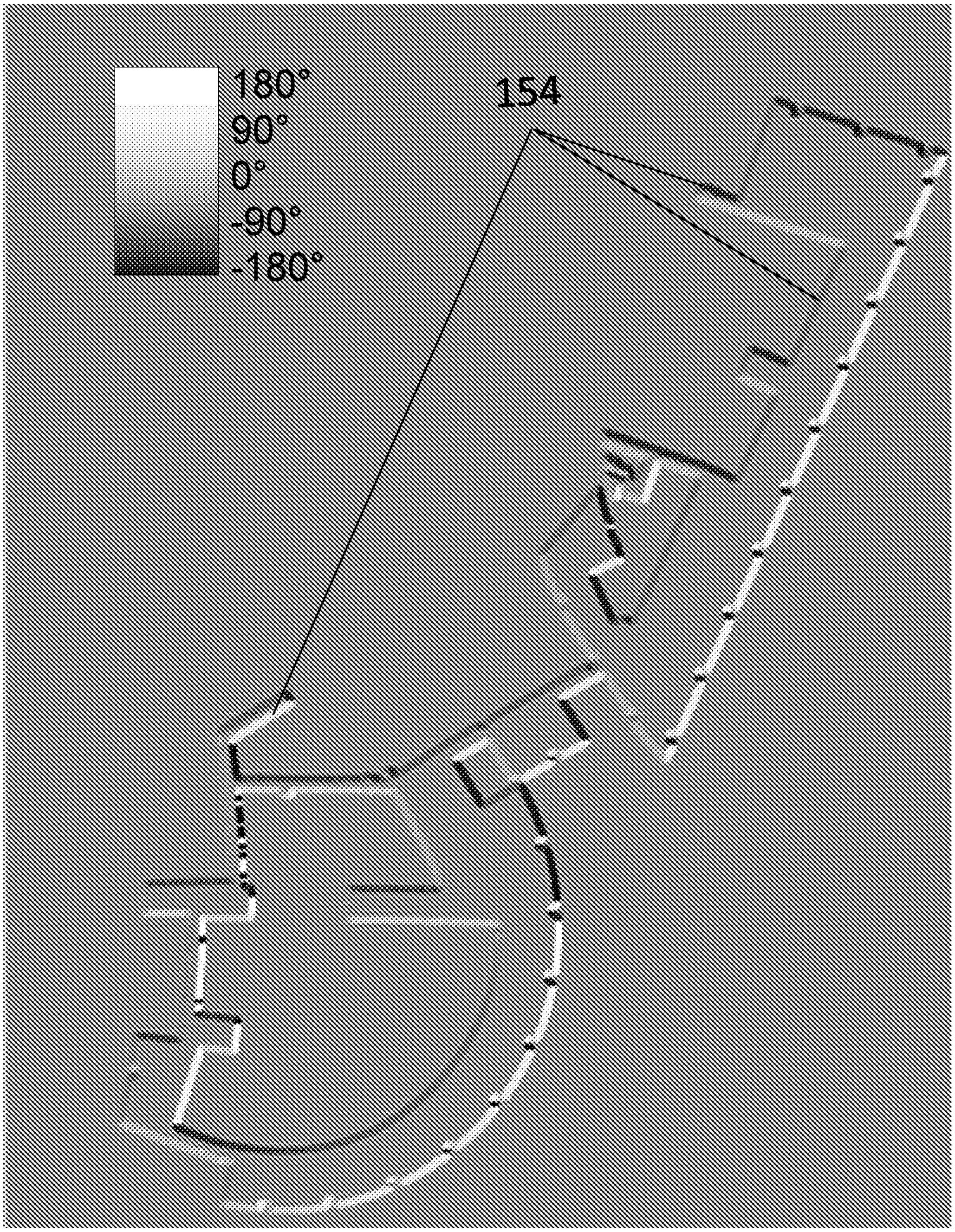

At step 122, the localisation system 104 identifies reference features from the floor plan 136 of the building. FIG. 4(*a*) shows the original flow plan 136 which explicitly illustrates or implies certain information (such as locations, shapes, areas and functions) of a plurality of objects of the building, which may be extracted as reference features for subsequent use. Some typical reference features of the floor plan 136 as can be seen on FIG. 4(*a*) comprise location, shape and area of a plurality of rooms 138, location, area and direction of a plurality of corridors 140, location, thickness and direction of a plurality of walls 142, location and size of a plurality of doors 144, location, size and area of a plurality of halls 146, location, angles and direction of a plurality of corners 148 corresponding to a plurality of junctions 150 etc. FIG. 4(*b*) illustrates a flood fill map, generated from the floor plan 136 by using a flood fill algorithm. For pre-processing the floor plan 136, the flood fill starts with filling the floor plan 136 at an initial guess pose, and a number of particles are also randomly distributed around the initial guess pose, flood filling then creates fake unknown cells 262 and empty cells 260 (see FIG. 9) in the floor plan 136, which assists subsequent Sobel process in determining gradient direction from this flood fill map. The region 152 in black colour in FIG. 4(*b*) is the region that the robot 100 is able to travel, while the rest parts of the floor plan 136 are hid in white colour for ease of reference to the region 152. FIG. 4(*c*) illustrates processing result of applying Gaussian filter with Sobel filter to FIG. 4(*b*). Gaussian kernels are applied prior to Sobel kernels, resulting in thickening and smoothing the gradient direction map 160 (see FIG. 5(*a*)), $f_\Theta$ for the occupied cells 154 and in a diffused effect on the magnitude map $f_G$ around the occupied cells 154 (the diffused effect will be discussed in relation to FIG. 5(*c*)). FIG. 4(*c*) shows that the occupied cells 154 are thickened and indicated in grey-scale, wherein a grey-scale represents an angle which is in a range from −180 degrees to 180 degrees; the angle indicates a normal of a surface of a wall 142, which generally indicates the direction pointing from the unknown cells 262 toward the empty cells 260.

Figure 6:
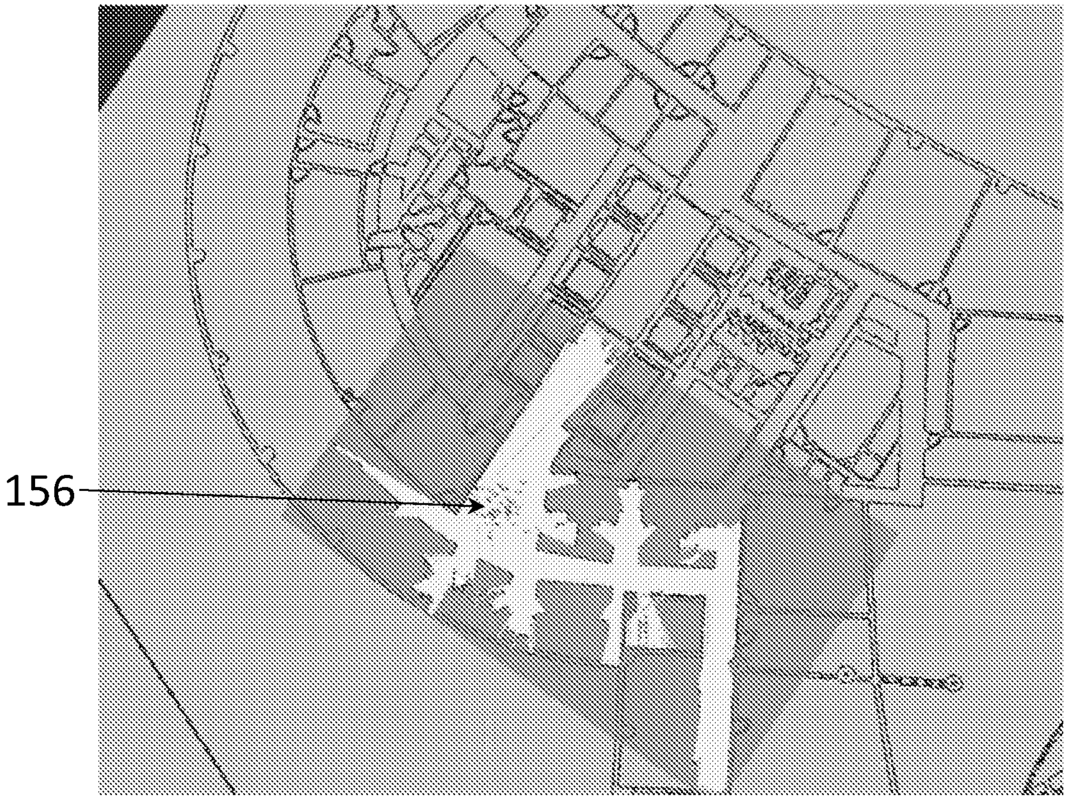
FIG. 6 illustrates a plurality of predicted poses of the robot generated using the method of FIG. 3.

Returning to FIG. 3 at step 124, the localisation system 104 generates a predicted pose 156 (see FIG. 6) of the robot's current location on the floor plan 136 based on the identified reference features. Each of the plurality of dots in FIG. 6 represents a predicted pose 156 generated at step 124. The localisation system 104 comprises a simulated motion model, which is able to receive and consider movement information of the robot 100. The simulated motion model may be built using methods known in the art. Based on the movement information of the robot 100, a potential pose of the robot 100 is predicted. The simulated motion model takes into consideration of a pose predicted and/or detected at a previous location of the robot 100, or where there is no previous location, generate an initial guess pose. Gaussian noise is applied to the simulated motion model for each particle to predict pose of the robot.

Figure 5:
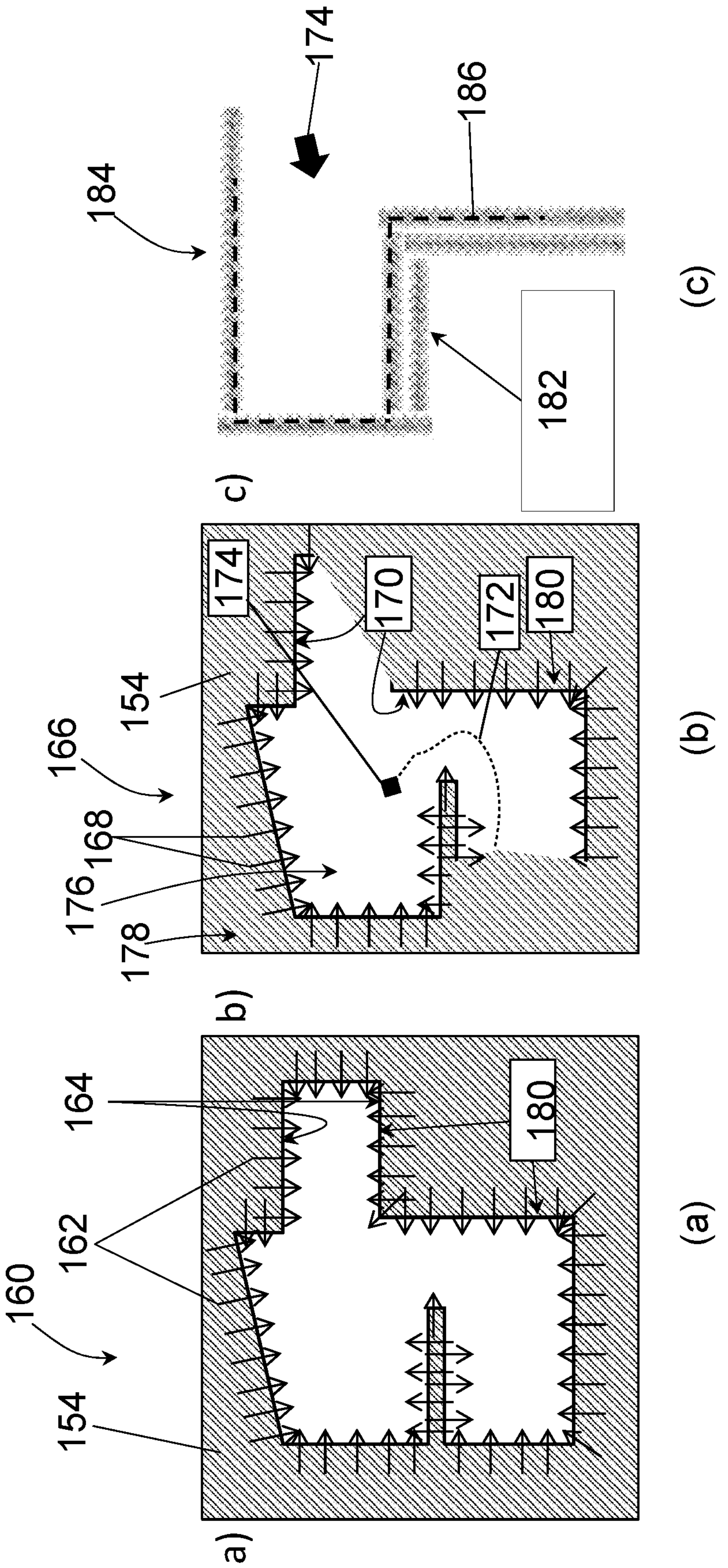
FIGS. 5(*a*)-(*c*) illustrate two gradient direction maps and a gradient magnitude map for use in the method of FIG. 3.

At step 126, the localisation system 104 scans the on-site reference features 186 (see FIG. 5(*c*)) of the environment of the robot's current location, using a 2D LiDAR sensor in this embodiment. The scanned on-site reference features 186 comprise information corresponding to the reference features identified from the floor plan 136 (such as the wall 142, the corner 148), or information corresponding partially to the reference features identified from the floor plan 136 (such as, part of the wall 142 which means at least one part of the wall 142 is blocked by an object that is not reflected in the floor plan 136, such as a closet, a sofa, etc.), or information which could not be identified from the floor plan 136, such as a human, or an object that is not reflected in the floor plan 136, such as the closet, the sofa, etc.). The scanned on-site reference features 186 help to identify the real environment surrounding the robot 100.

At step 128, the localisation system 104 generates a map 158 (see FIG. 11) for the current location based on the scanned on-site reference features 186 of the current location and last N frames of historical scans of previous on-site reference features 186 of a plurality of locations that the robot 100 traversed through before reaching the current location. The last N frames is set to be fewer than the total frames of the historical scans, which is determined in advance. By constructing the map based on the determined number of frames of historical scans, the generated map 158 will reflect conditions of the on-site reference features 186 in the region that the last N frames of historical scans cover. As only the last N frames of historical scans are used in this method, this method may be called partial simultaneous localization and mapping (PSLAM) algorithm and the map 158 is called PSLAM map 158 for ease of reference.

For further processing, the generated PSLAM map 158 and the floor plan 136 are pre-processed. In this embodiment, a Sobel filter is used to detect edges from the PSLAM map 158 and the floor plan 136 for computing direction of facing of wall surfaces 170 (see FIG. 5(*b*)). The Sobel filter comprises a pair of convolution kernels that compute horizontal changes $G_x$ and vertical changes $G_y$, which are used to compute magnitude using Equation (2) to find edges in the PSLAM map 158 and the floor plan 136. These two changes are further used to compute the orientation of gradients in the images using Equation (1). Occupancy grid maps are generated as grayscale images by filling the unknown cells 262, the occupied cells 154 and the empty cells 260 with grayscale pixel values of 255, 100 and 0, thereafter the Sobel convolution process is carried out and the gradient direction map 160 is generated using Equation (2). With the above analysis, surface normal information from LiDAR observation and floor plan structure obtained to be taken into account subsequently.

$$\text{direction, } {}^{map}\Theta = a\tan 2\left(\frac{{}^{map}G_y}{{}^{map}G_x}\right) \tag{1}$$

$$\text{magnitude, } {}^{map}G = \sqrt{{}^{\text{map}}G_x^2 + {}^{\text{map}}G_y^2} \tag{2}$$

FIG. 5(*a*) illustrates a gradient direction map 160 generated from a portion of the floor plan 136, where normal directions 162 of surface 164 of the occupied cells 154 are illustrated. FIG. 5(*b*) illustrates a gradient direction map 166 generated from a portion of the PSLAM map 158 corresponding to the portion of the floor plan 136 in FIG. 5(*a*), wherein normal directions 168 of the wall surfaces 170 that can be viewed by the robot 100 travelling along a track path 172 to a robot pose 174. The normal direction 168 can be predicted on the occupied cells 154 by computing angle pointing toward an empty region 176 and opposite an unknown region 178. The gradient directions 264 can be used to differentiate particles matching against a rear surface 180 of the occupied cells 154 from those matching against the surface 164 of the occupied cells 154 in the floor plan 136.

Further, the scale plan is also pre-processed by diffusing the occupied cells 154 in the floor plan 136. To diffuse the occupied cells 154, values are assigned to grids of the floor plan 136 corresponding to the occupied cells 154, with those grids at the centres of diffused occupied cells 182 being assigned with higher value than those are away from the centres. FIG. 5(*c*) illustrates an exemplary gradient magnitude map 184 converted from the floor plan 136 with the diffused occupied cells 182, using Gaussian filter, where the diffused occupied cells' values are diffused with bell curve characteristics. The dashed lines illustrate LiDAR endpoints reflecting scanned the on-site reference features 186 matching the diffused occupied cells 182, which helps to localise the robot pose 174.

Returning to FIG. 3 at step 130, the localisation system 104 calculates weight of the predicted pose 156 of the robot 100 on the floor plan 136. The predicted pose 156 comprises a plurality of particles, each associating with a particle weight. The particle weight of the plurality of particles are calculated by associating the generated PSLAM map 158 to the floor plan 136, or where the PSLAM map 158 and the floor plan 136 are converted to gradient direction maps, by associating the gradient direction maps.

Figure 7:
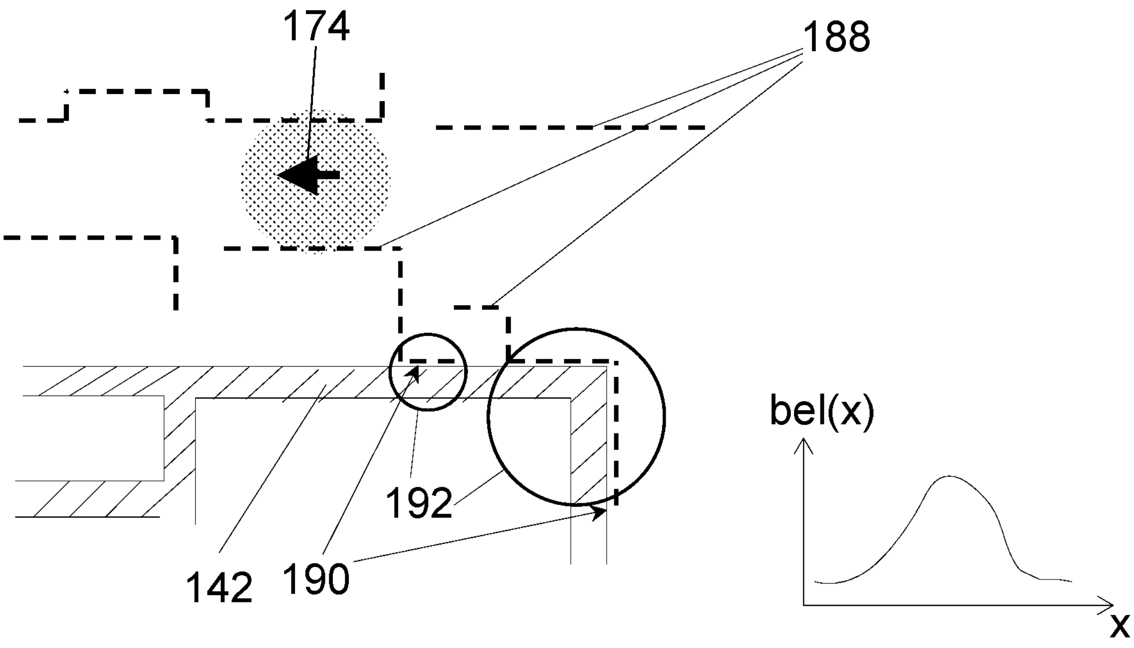
FIG. 7 illustrates an example of a map generated using the method of FIG. 3 being aligned to the floor plan.

The PSLAM map 158 is aligned to the floor plan 136 for localising the robot 100 based on the on-site detected reference features on the PSLAM map 158 and the reference features identified on the floor plan 136. FIG. 7 illustrates an example of the PSLAM map 158 being aligned to the floor plan 136, comprising LiDAR endpoints representing walls 188 from the PSLAM map 158 and the walls 142 comprising a surface 190 from the floor plan 136. Although a majority portion of the walls 188 from the PSLAM map 158 do not match the walls 142 from the floor plan 136, the areas in circles 192 provide a match to the surface 190, which can be used to align the PSLAM map 158 to the scale plan 136. Information of the areas in the circles 192 come from historical scans used for generating the PSLAM map 158 in step 128. This way, the weight in the true robot pose 174 is maintained even when the robot 100 enters a fully wall-occluded zone from 2D LiDAR observation. Based on the successful alignment, particle weights are calculated as discussed below.

With the gradient direction map 166 generated from the PSLAM map 158, the direction grid map 160 and the gradient magnitude map 184 generated from the floor plan 136, and the predicted pose 156 comprising pose information of the plurality of particles, a weight $w_t$ of each particle [m] is calculated based on these inputs, using Equations (3) and (4) as below.

$$q_{j,t}^{[m]} = 1 - \frac{2\left|atan2\left(\frac{\sin\left({}^{s}\theta(j_t) - {}^{f}\theta\left(j_t, {}^{f}x_t^{[m]}, {}^{s}x_t\right)\right)}{\cos\left({}^{s}\theta(j_t) - {}^{f}\theta\left(j_t, {}^{f}x_t^{[m]}, {}^{s}x_t\right)\right)}\right)\right|}{\pi} \quad (3)$$

Equation (3) calculates an angle's fitting score, $$q_{j,t}^{[m]}$$

for each occupied cell 154 in the PSLAM map 158, where, G∈G represents the occupied cell's magnitude in the gradient magnitude map 184, θ∈Θ represents the occupied cell's angle which in turn represents the occupied cell's normal direction which is identified from the PSLAM map 158 or the floor plan 136, j comprises (x,y) which are coordinates of the occupied cell 154 in the PSLAM map 158, $${}^{f}x_t^{[m]}$$

represents the predicted pose 156 of the robot 100 on the floor plan 136, f of the particle [m], $s_{x_t}$ represents the robot pose 174 on the PSLAM map 158, s, $s_\Theta$ $(j_t)$ represents the angle value of the occupied cell 154, j in the PSLAM map 158, s, $${}^{f}\theta\left(j_t, {}^{f}x_t^{[m]}, {}^{s}x_t\right)$$

represents the angle value of floor plan's cell that associated with the occupied cell 154, j in the PSLAM map 158 when pose of the robot is predicted at $${}^{f}x_t^{[m]}$$

in the floor plan 136 and $s_{x_t}$, in the PSLAM map 158. Equation (3) yields a positive value to the angle's fitting score $$q_{j,t}^{[m]},$$

if the angle between the gradient direction 264 of the PSLAM map 158 and the gradient direction 264 of the floor plan 136 is less than 90 degree, vice versa.

$$w_t^{[m]} = \sum_{j=0}^{J} \begin{cases} 0, & \text{if } q_{j,t}^{[m]} \le 0 \\ \frac{q_{j,t}^{[m]} * {}^{f}G\left(j_t, {}^{f}x_t^{[m]}, {}^{s}x_t\right)}{d(j_t, {}^{s}x_t)}, & \text{if } q_{j,t}^{[m]} > 0 \end{cases} \quad (4)$$

After the angle's fitting scores are calculated, Equation (4) is used to calculate weight, $w_t$ for each particle of the predicted pose 156. Based on value of the corresponding angle's fitting score of the occupied cell 154 at the corresponding particle [m], there are two ways of calculating the weight. If the corresponding fitting score is zero or negative, then assign zero as the value of the weight for the corresponding particle. If the corresponding fitting score is higher than zero, then further enhance the fitting score using the associated occupied cell's magnitude, $${}^{f}G\left(j_t, {}^{f}x_t^{[m]}, {}^{s}x_t\right)$$

from the gradient magnitude map 184 of the floor plan 136 and a distance, $d(j_t, s_{x_t})$ between the occupied cell 154, j and the robot pose 174, $s_{x_t}$ in the map. As shown in Equation (4), the weight is calculated to be proportional to the occupied cell's magnitude, $${}^{f}G\left(j_t, {}^{f}x_t^{[m]}, {}^{s}x_t\right),$$

and inverse proportional to the distance, $d(j_t, s_{x_t})$. Equations (3) and (4) realise that the score received from j is strengthened if coordinate j is near to the robot pose 174, and if j is fitting in or close to the occupied cells 154 on the floor plan 136. Dividing $d(j_t, s_{x_t})$ helps to avoid a situation that the robot 100 drifts away from the true pose because of high accumulated error from the historical frames of scans that were matched to the discrepancy of the floor plan 136 resulting in neglecting the matching of j that is near to robot's pose in the PSLAM map 158. The score of the occupied cells 154 in the PSLAM map 158 are then accumulated to present as a weight of the particle [m].

At step 132, the localisation system 104 localises the robot 100 based on the calculated weights of the plurality of particles, wherein the pose of the particle with the highest weight is used as the corrected robot pose.

At step 134, based on the calculated weights of the plurality of particles, the localisation system 104 proceeds with re-sampling a new set of plurality of particles according to the current particle weights. These re-sampled particles may be used for generating a predicted pose 156 for another location.

EXAMPLES OF IMPLEMENTATION

Figure 8:
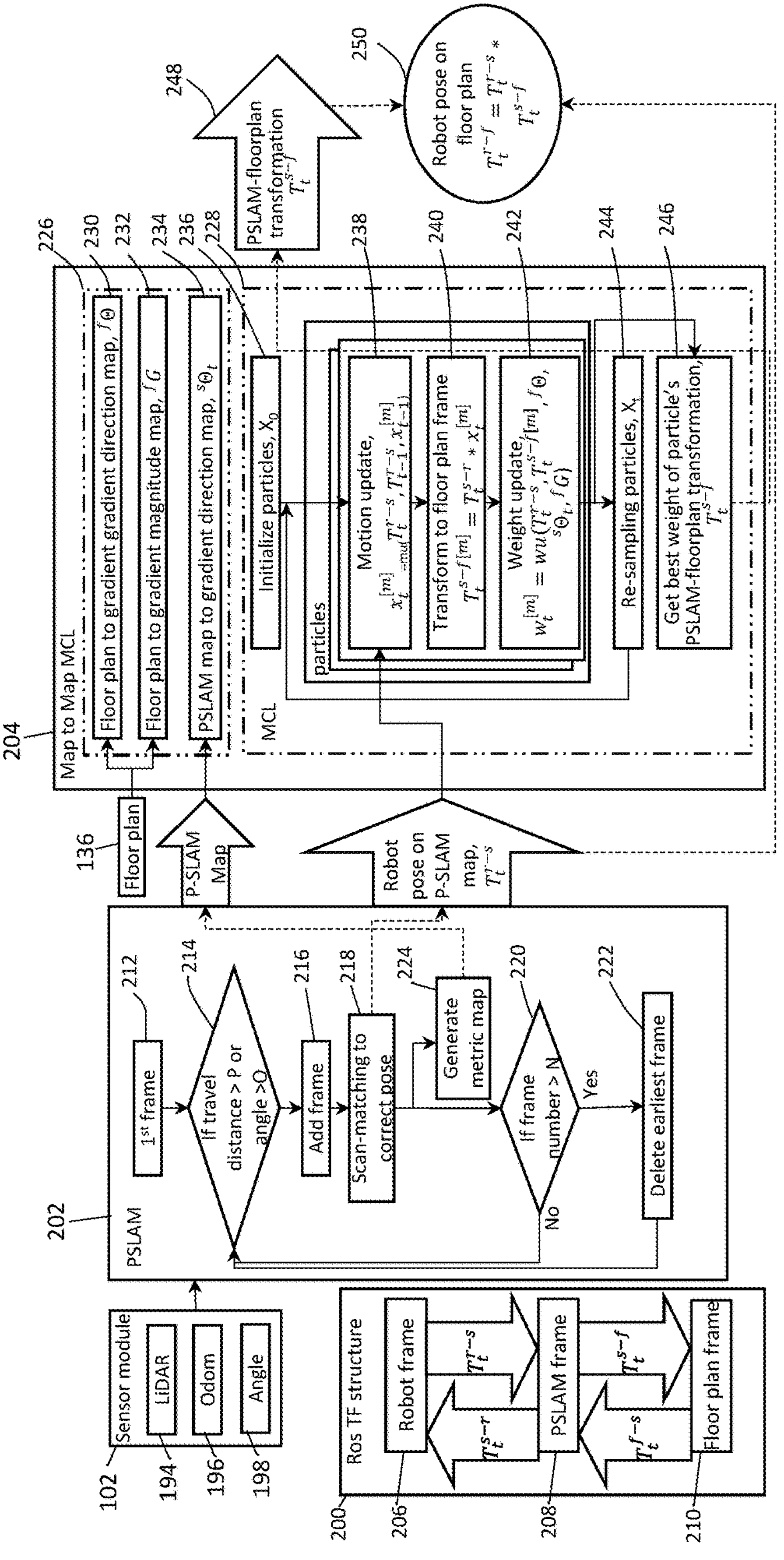
FIG. 8 illustrates a first example of implementation of the method of FIG. 3.

For illustrating how the method may be implemented, two examples of implementation are described below. FIG. 8 illustrates the first example of implementation of the method of localising the robot 100 on the floor plan 136 of the building. In this example, Monte Carlo Localisation (MCL) method is used as a skeleton to integrate the methods proposed in the present invention, while PSLAM is implemented separately to continuously publish updated PSLAM maps 158. The sensor module 102 comprises a 2D LiDAR sensor 194, an odometer 196 and a steering angle sensor 198.

FIG. 8 illustrates a structure of transformation in Robot Operating System (Ros TF structure) 200, a flow chart of PSLAM 202 and a flow chart of MCL 204. The Ros TF structure 200 comprises a robot frame 206, a PSLAM frame 208 and a floor plan frame 210. The PSLAM frame 208 and the floor plan frame 210 are map frames. The floor plan frame 210 is a top static frame while the PSLAM frame 208 is a dynamic frame. Robot-PSLAM transformation, $$T_t^{r-s}$$

is used to transform coordinates from the robot frame 206 to the PSLAM frame 208 while in the opposite direction, PSLAM-robot transformation, $$T_t^{s-r}$$

is used to transform coordinates from the PSLAM frame 208 to the robot frame 206; and PSLAM-floorplan transformation, $$T_t^{s-f}$$

is used to transform coordinates from the PSLAM frame 208 to the floor plan frame 210 while in the opposite direction, floorplan-PSLAM transformation, $$T_t^{f-s}$$

is used to transform coordinates from the floor plan frame 210 to the PSLAM frame 208. The pose of the robot 100 is optimized when above four transformations are corrected.

In FIG. 8, for ease of review, some steps with transformations between different coordinate frames are illustrated in dashed-line arrows. The PSLAM flow chart 202 starts with step 212 of receiving a first frame of scanning results of the 2D LiDAR sensor 194. As the robot 100 travels, movement information of the robot 100 and environment of the locations that the robot 100 travels through are detected. Specifically, the 2D LiDAR sensor 194 scans the environment of the robot 100, the odometer 196 detects travelled distance of the robot 100, and the steering angle sensor 198 detects travelled angle of the robot 100. Step 214 is a continuous step for the localisation system 104 to monitor the movement of the robot 100, so that if the robot 100 travelled a distance that is greater than a threshold 'P' or turned an angle that is greater than a threshold 'O', then the localisation system 104 proceeds to step 216. At step 216, the localisation system 104 receives a scan of the on-site reference features 186 of the robot's current location, detected by the 2D LIDAR sensor 194. The captured on-site reference features 186 are used as a basis for determining pose of the robot 100. At step 218, the localisation system 104 matches the scan of the on-site reference features 186 of the current location to the stored historical scans of previous on-site reference features 186 of a plurality of locations that the robot 100 traversed through before reaching the current location. At step 220, the localisation system 104 determines whether the stored number of frames of scans exceeds a threshold N, and if so, proceeds to step 222 where upon the earliest stored frame is deleted. After the earliest frame is deleted, the localisation system 104 continues the monitoring step 214 and starts a new iteration as the robot 100 moves to meet the thresholds. Separately, at step 224, based on the scanning-match result of step 218, the localisation system 104 generates the PSLAM map 158, a metric map. As shown in FIG. 8, this example only involves scanning-match to correct the PSLAM map 158 and the robot pose 174, and does not involve close loop processing.

The MCL flow chart 204 comprises two stages: a pre-processing stage 226 and a processing stage 228. At the pre-processing stage 226, the localisation system 104 takes the floor plan 136 and the PSLAM map 158 as inputs to carry out some pre-processing steps. At step 230, the localisation system 104 carries out pre-processing by converting the floor plan 136 to the gradient direction map 160, $f_\Theta$, the gradient directions 264 indicate normal directions 168 of surfaces of fixed or immovable objects of the building. At step 232, the localisation system 104 converts the floor plan 136 to the gradient magnitude map 184, $f_G$. A gradient magnitude of a point of the occupied cell 182 in the gradient magnitude map 184 is proportional to a distance between the point to a surface of the occupied cell 182, and the value follows Gaussian distribution with regard to the distance between the point to the surface of the occupied cell 182. Where the PSLAM map 158 becomes available, at step 234, the localisation system 104 converts the PSLAM map 158 to the gradient direction map 166, $s_{\Theta_t}$, the gradient directions 264 indicate normal directions 168 of surfaces detected through the scanning. The processing stage 228 starts with step 236, where a plurality of initialize particles, $X_0$, is generated. Step 238 is a motion update step, the localisation system 104 predicts next iteration of robot pose particle distribution based on information of previous pose. The pose of particle [m] on the floor plan 136 at time t, $$x_t^{[m]}$$

is predicted based on formula $$x_t^{[m]} = mu\left(T_t^{r-s},\ T_{t-1}^{r-s},\ x_{t-1}^{[m]}\right),$$

wherein $$T_t^{r-s}$$

is robot-PSLAM transformation at time t, $$T_{t-1}^{r-s}$$

is robot-PSLAM transformation at time t−1, and $x_{t-1}^{[m]}$ is pose of the particle [m] on the floor plan 136 at time t−1; a transformation is represented as the robot pose for each localised pose. Time t−1 refers to the time of a previous frame of scan before scanning the current location at time t. At step 240, the pose $$x_t^{[m]}$$

predicted at step 238 is used to generate a pose transformation of particle [m] on the, floor plan 136 using formula $$T_t^{s-f[m]} = T_t^{s-r} * x_t^{[m]}.$$

At step 242, based on the robot-PSLAM transformation, $$T_t^{r-s},$$

the pose transformation of particle [m] on the floor plan 136

$$T_t^{s-f[m]},$$

the floor plan gradient direction map 160, $f_\Theta$, the PSLAM gradient direction map 166, $s_{\Theta_t}$, and the floor plan gradient magnitude map 184, $f_G$, the weight of the particle [m], $$w_t^{[m]}$$

is calculated, using Equations (3) and (4).

Figure 9:
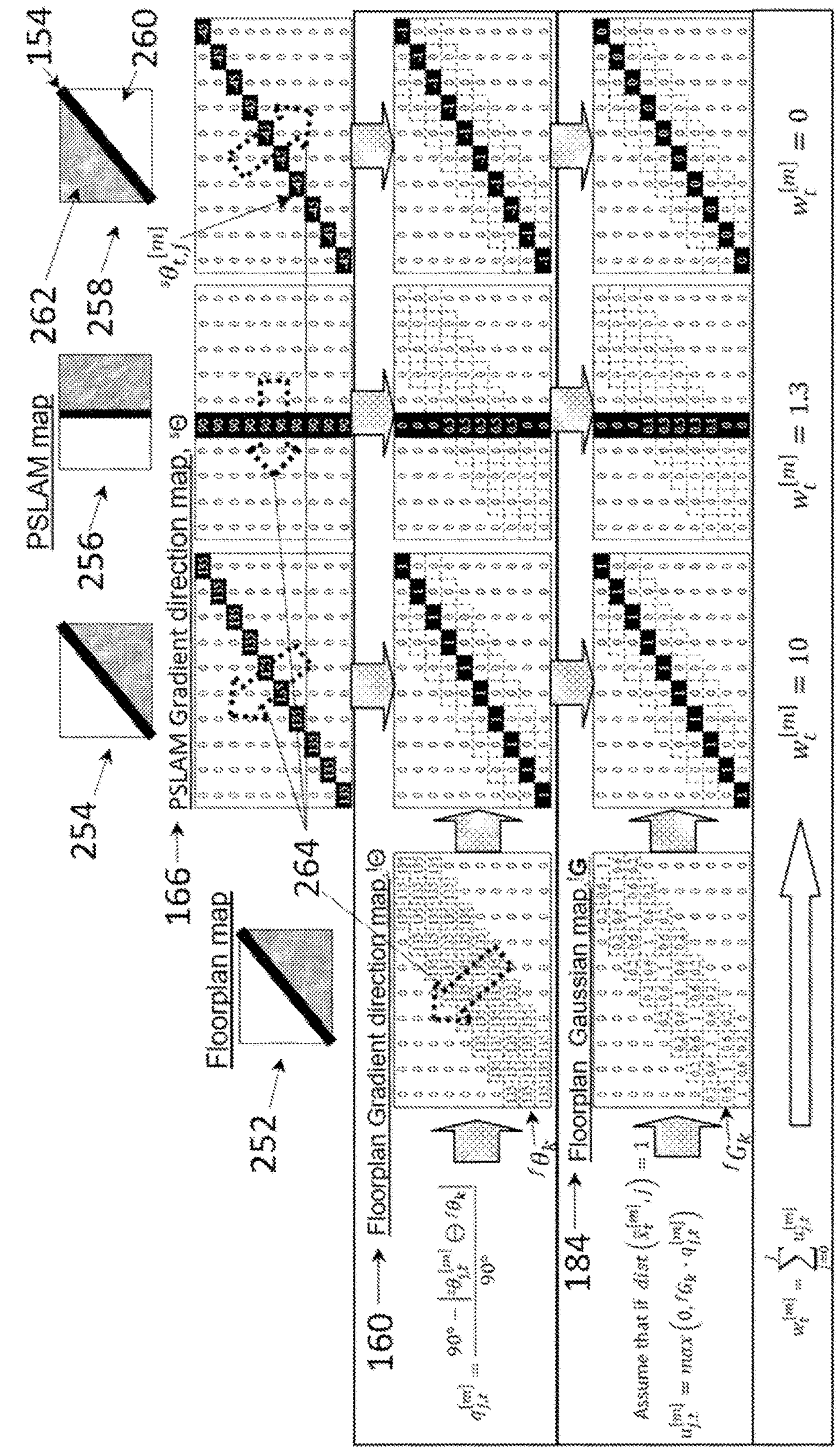
FIG. 9 illustrates calculation of weight used in the method of FIG. 3.

FIG. 9 demonstrates steps of calculation of weight, using Equation (5) which originates from Equations (3) and (4). The inputs comprise a sample floor plan 252, and three associated sample PSLAM maps 254, 256 and 258.

$$w_t^{[m]} = \sum_{j=0}^{J} \max\left(0, {}^{f}G_k \frac{90^\circ - \left|{}^{s}\theta_{j,t}^{[m]} \ominus {}^{f}\theta_k\right|}{90^\circ \cdot dist\left(sx_t^{[m]}, j\right)}\right) \tag{5}$$

In Equation (5), $$dist\left(sx_t^{[m]}, j\right)$$

represents distance between pose of robot and occupied cell (x,y) in PSLAM map; $f_{G_k}$ represents gradient magnitude of floor plan in occupied cell k(x,y) that correspond to j(x,y).

Before calculating weights, the sample floor plan 252 is converted to the gradient direction map 160, $f_\Theta$ and a Gaussian map (i.e. the gradient magnitude map 184), $f_G$. The three sample PSLAM maps 254, 256 and 258 are converted to the gradient direction maps 166, $s_\Theta$, respectively. The matrices of the sample floor plan 252 and the sample PSLAM maps 254, 256 and 258 comprise the empty cells 260, the occupied cells 154 and the unknown cells 262. The occupied cells 154 demonstrate structures of the building. The gradient direction 264 are orthogonal to the occupied cells 154 in the respective gradient direction map, pointing from the unknown cells 262 to the empty cells 260. As shown in FIG. 9, among the three sample PSLAM maps 254, 256 and 258, direction of the PSLAM gradient direction map 166 of the sample PSLAM map 254, $s_\Theta$ is the same as direction of the floor plan gradient direction map 160, $f_\Theta$, direction of the PSLAM gradient direction map 166 of the sample PSLAM map 256, $s_\Theta$ and the direction of the floor plan gradient direction map 160, $f_\Theta$ form a 45 degree angle, and direction of the PSLAM gradient direction map 166 of the sample PSLAM map 258, $s_\Theta$ is opposite to the direction of the floor plan gradient direction map 160, $f_\Theta$.

Angle's fitting score, $$q_{j,t}^{[m]},$$

for each occupied cell 154 in each sample PSLAM map is calculated based on the floor plan gradient direction map 160, $f_\Theta$ and each of the PSLAM gradient direction maps 166, $s_\Theta$, using formula (6):

$$q_{j,t}^{[m]} = \frac{90^\circ - \left|{}^{s}\theta_{j,t}^{[m]} \ominus {}^{f}\theta_k\right|}{90^\circ} \tag{6}$$

wherein, as indicated in FIG. 9, $${}^{s}\theta_{j,t}^{[m]}$$

refers to elements in the PSLAM gradient direction maps 166, while $f_{\theta_k}$ refers to elements in the floor plan gradient direction map 160. Angle's fitting score, $$q_{j,t}^{[m]},$$

is calculated to be 1 for the sample PSLAM map 254, as the direction of the PSLAM gradient direction map 166 of the sample PSLAM map 254 is the same as the direction of the floor plan gradient direction map 160. The angle's fitting score, $$q_{j,t}^{[m]}$$

is calculated to be 0.5 for the sample PSLAM map 256 as the direction of the PSLAM gradient direction map 166 of the sample PSLAM map 256 and the direction of the floor plan gradient direction map 160 form a 45 degree angle. The angle's fitting score, $$q_{j,t}^{[m]}$$

is calculated to be −1 for the sample PSLAM map 258 as the direction of the PSLAM gradient direction map 166 of the sample PSLAM map 258 is opposite to the direction of the floor plan gradient direction map 160. With calculated angle's fitting scores, assuming that dist($s_{x_t}$,j)=1, the weight for each particle is calculated using the Equation (7)

$$u_{j,t}^{[m]} = \max(0, {}^{f}G_k \cdot q_{j,t}^{[m]}) \quad (7)$$

wherein $f_{G_k}$ refers to elements in the floor plan Gaussian map 184. Thereafter, the accumulated weight of interest cells, $$w_t^{[m]}$$

is calculated by summing up the weight of each particle, i.e.

$$w_t^{[m]} = \sum_{j=0}^{J} u_{j,t}^{[m]}.$$

For illustrating changes of weight of every single interest cell, the relevant elements in the matrices are highlighted with black background in FIG. 9. Overall, FIG. 9 demonstrates that the weight of the sample PSLAM map 254 which has the same gradient direction 264 with the sample floor plan 252 is the highest among the three sample PSLAM maps 254, 256 and 258. Even if two PSLAM maps (254 and 258) share the same angle's fitting score, $$q_{j,t}^{[m]},$$

with opposite directions, the method of the present invention would be able to distinguish the difference due to the gradient direction 264.

Turning back to FIG. 8 at step 244, after the weight for all the particles, $X_0$, are calculated, the localisation system 104 re-samples the particles as $X_t$. Separately, at step 246, with the calculated weights, the localisation system 104 obtains the best weight of particle's PSLAM-floorplan transformation, $$T_t^{s-f}.$$

At step 248, the MCL generates $$T_t^{s-f}$$

as the processing output. At step 250, the outputted $$T_t^{s-f}$$

is used together with the robot-PSLAM transformation $$T_c^{r-s}$$

to calculate the robot pose 174 on floor plan, $$T_t^{r-f},$$

using formula $$T_t^{r-f} = T_t^{r-s} * T_t^{s-f},$$

whereupon the robot 100 is localised.

Figure 10:
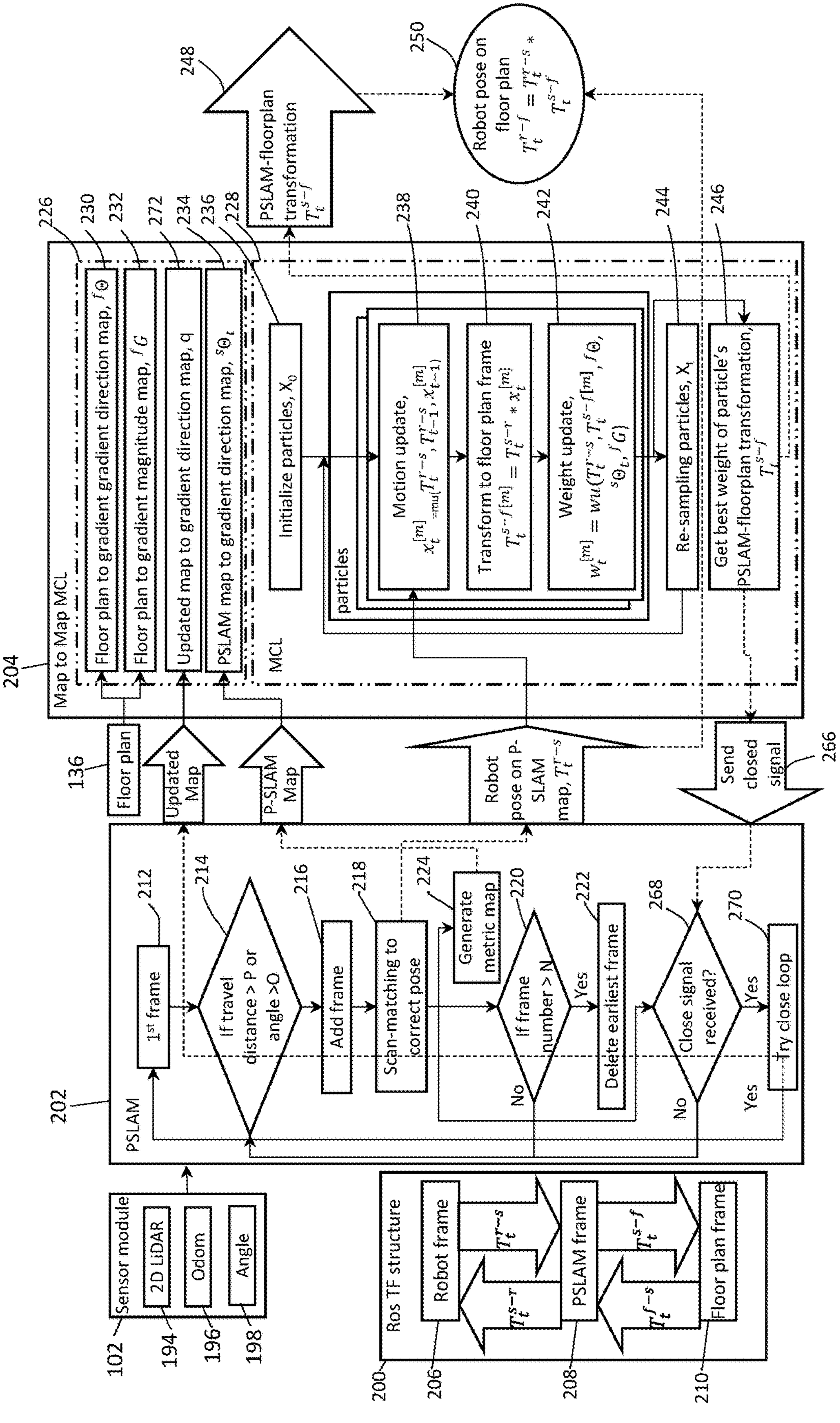
FIG. 10 illustrates a second example of implementation of the method of FIG. 3.

FIG. 10 indicates the second example of implementation of the method of localising the robot 100 on the floor plan 136 of the building. As can be seen from FIGS. 8 and 10, the second example shares common steps with the first example and comprises additional steps for realising a closed-loop process. Therefore, for conciseness, the common steps between the two examples will not be described again. At step 266, after the best weight is obtained for an iteration of the MCL method, a closed signal is sent to the PSLAM process if the weight exceeds a closed-loop threshold. On the other hand, after step 218, the PSLAM process proceeds to step 268 to check if a closed signal is received. If no closed signal has been received, the localisation system 104 continues to monitor the motion of the robot 100 at step 214. For this closed-loop process, all the frames of historical scans are stored and used to generate and update a map of the building. If a closed signal is received, the loop is closed at step 270 and the updated map of the building is stored for subsequent use at pre-processing step 272, where the updated map of the building is converted to a gradient direction map, q, which is used to improve the MCL process for localisation.

Experiments are conducted to investigate effectiveness of the localisation method of the present invention. For the purpose of the experiments, an office building in Singapore is chosen as the designated environment, the localisation was performed on level 9 and level 12 of the office building, based on 2D floor plan 136 of the office building. A 2D LiDAR map was built using a known algorithm, G-Mapping, which is then aligned to the 2D floor plan map to match with the G-Mapping built map with eyeballing, so both maps share the same resolution and same world coordinates.

A robot, Pioneer P3-DX equipped with Hokuyo UTM-30LX LiDAR with a field of view of 250° and a range of 30.0 m, is used to perform navigation tasks. All the sensor readings including odometer information are recorded by using an existing Rosbag package. Sensor readings from Rosbag are extracted to perform localisation using an Adaptive Monte Carlo Localisation (AMCL) approach with the G-mapping built map as ground truth of localisation information. Thereafter, the same Rosbag is used to perform the localisation method of the present invention (hereinafter referred to as "the PSLAM method") with different historical frame numbers being used for constructing the PSLAM map 158. The readings of both localisations are then compared for computing errors.

Figure 11:
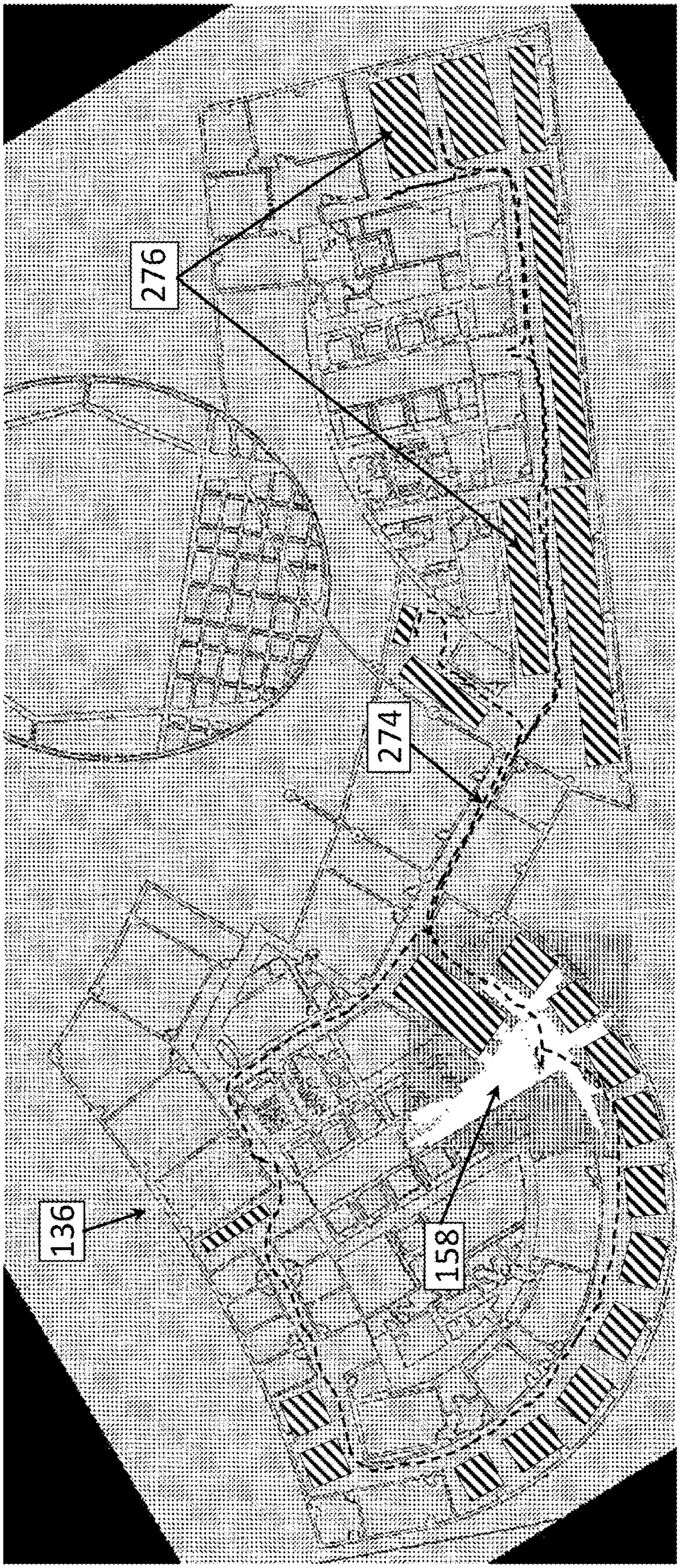
FIG. 11 illustrates a result of using the method of FIG. 3 in localising a robot in a building.

FIG. 11 demonstrates a trajectory 274 obtained using the PSLAM method on level 9 during the experiments. The trajectory 274 drawn in dotted line represents the path that the robot 100 travelled during the experiments. The white region is the dynamic PSLAM map 158, constructed based on on-site scanning by the 2D LiDAR sensor 194. The hash boxes indicate regions, high discrepancy regions 276, occluded with working cubicles in the real environment which are not drawn on the floor plan 136 in the experiments. FIG. 11 shows that the robot 100 using the PSLAM successfully localise itself in based on the floor plan 136, even when the floor plan 136 comprises high discrepancy regions.

Figure 12:
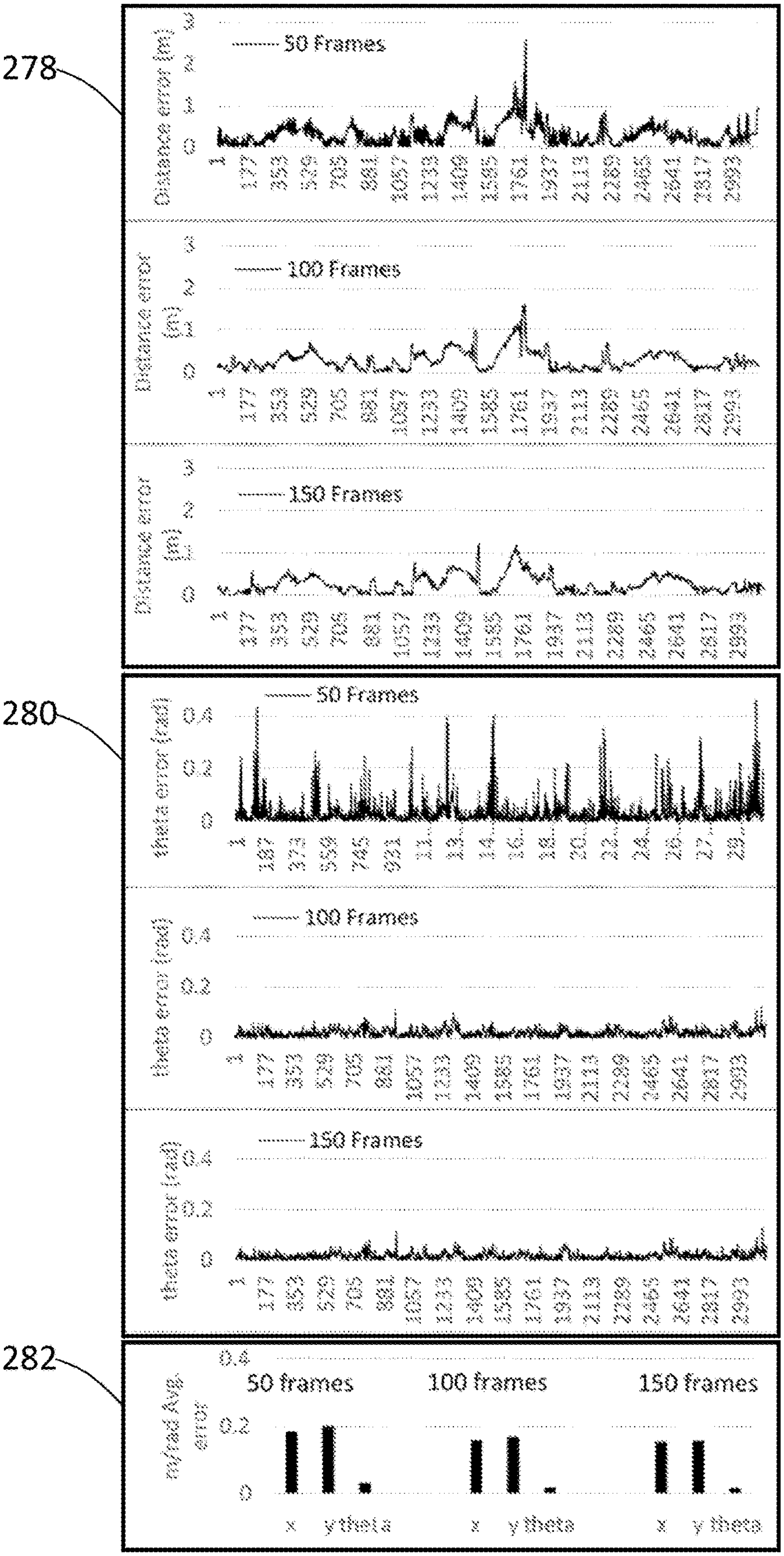
FIG. 12 illustrates errors of using the method of FIG. 3 in localisation on level 9 of an office building.

FIG. 12, illustrates errors of using the PSLAM method on level 9 of the office building. FIG. 12 comprises an upper part 278, a middle part 280 and a lower part 282. The upper part 278 illustrates distance errors occurred over time (the horizontal axis of the line charts represents frame index number) when the PSLAM method uses last 50 frames, last 100 frames or last 150 frames for constructing map at step 128. A general guideline for determining the number of frames to be used in the PSLAM method is that for most locations, at least 20 planar features (walls, etc.) should be visible to the sensor within the region the PSLAM map covers. As can be seen from the upper part 278, for most of the time, the distance errors of the PSLAM method were within 1 meter. Nonetheless, there were occasions where the distance errors became noticeably higher. When the PSLAM method was using the last 50 frames of historical scans for constructing map, the maximum distance error were longer than 2 meters. By increasing the number of frames from 50 to 100, the maximum distance error reduced to shorter than 2 meters but significantly longer than 1 meter. By further increasing the number of frames from 100 to 150, the maximum distance error reduced to slightly above 1 meter. The middle part 280 illustrates angle errors occurred over time when the PSLAM method uses last 50 frames, last 100 frames or last 150 frames for constructing map at step 128. When using 50 frames of historical scans for constructing map, some angle errors were greater than 0.4 radians and many angle errors were greater than 0.2 radians. By increasing the number of frames from 50 to 100, the angle errors were reduced significantly to far below 0.2 radians. The angle errors maintained at a stable level when further increasing the number of frames from 100 to 150. The lower part 282 shows an average of distance errors of localisation at the x coordinate and y coordinate, and the average of angle errors of localisation, when using the last 50 frames, last 100 frames or last 150 frames for constructing map at step 128. As can be seen from the lower part 282, the average distance error at the x coordinate is reduced if the number of frames is increased from 50 to 100 and/or from 100 to 150. Similar trends are observed on average distance error at the y coordinate and the average angle error (the angle errors of localisation are generally small so that the improvement may not be as obvious as that of the x and y coordinates), which is consistent with the above observations made from the upper part 278 and the middle part 280 that errors reduce with the more frames being used for constructing map.

Figure 13:
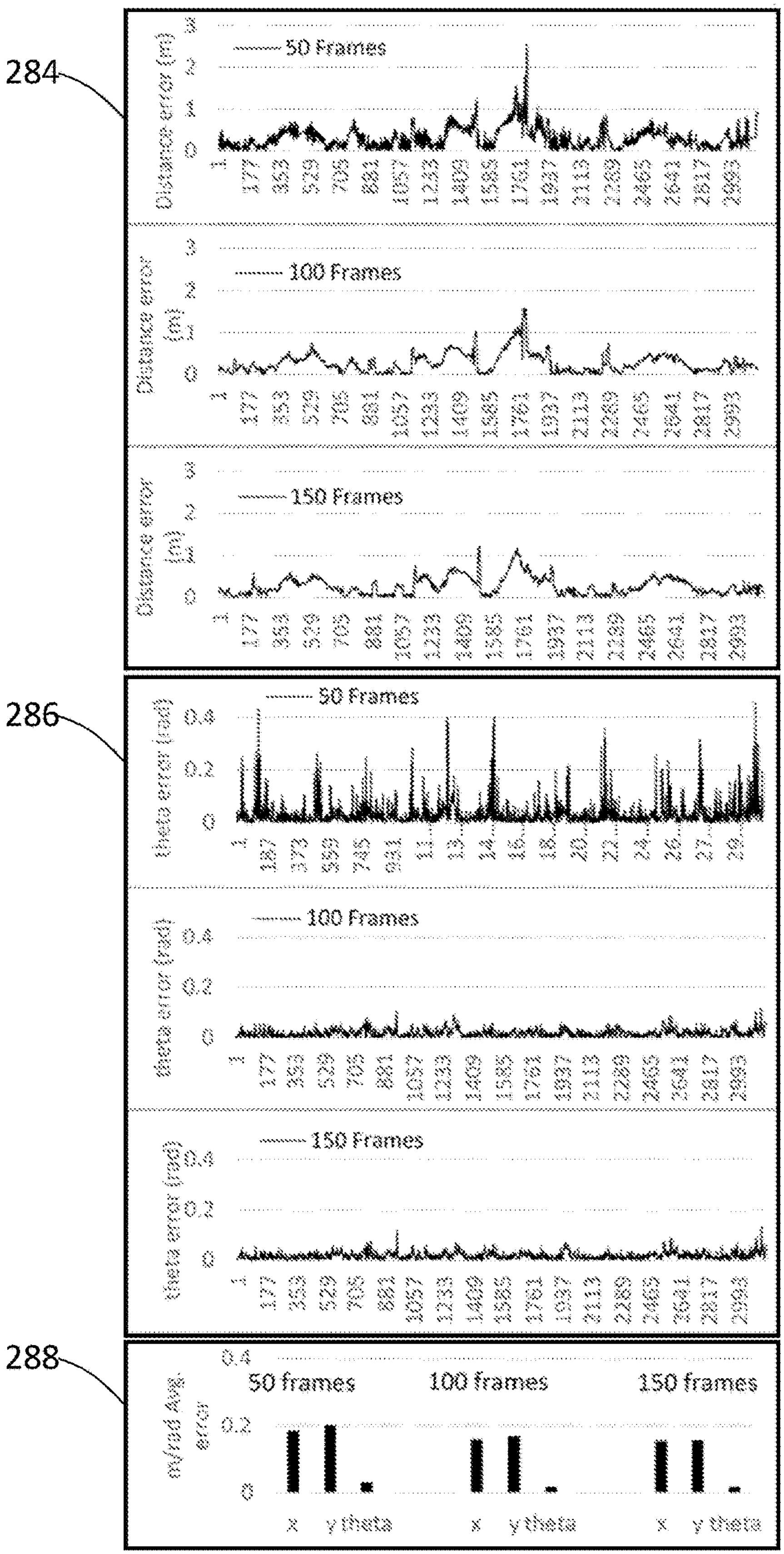
FIG. 13 illustrates errors of using the method of FIG. 3 in localisation on level 12 of same building as FIG. 12.

Similar to FIG. 12, FIG. 13 illustrates errors of using the PSLAM method on level 12 of the office building, comprising upper part 284, middle part 286 and lower part 288. As can be seen from the upper part 284, the distance errors of localisation reduced by increasing the number of frames used for constructing map from 50 to 100 and/or from 100 to 150. Similarly, as illustrated in the middle part 286, the angle errors reduced by increasing the number of frames used for constructing map from 50 to 100 and/or from 100 to 150. The lower part 288 shows the same effect as that shown by the lower part 282 of FIG. 12.

FIG. 12 and FIG. 13 illustrate similar trend of change of errors in relation to the number of frames being used at step 128. Overall, FIG. 12 and FIG. 13 do not show accumulating error effect, and demonstrate that the larger the historical frame number being used in the PSLAM method, the smaller the localisation errors will be.

Figure 14:
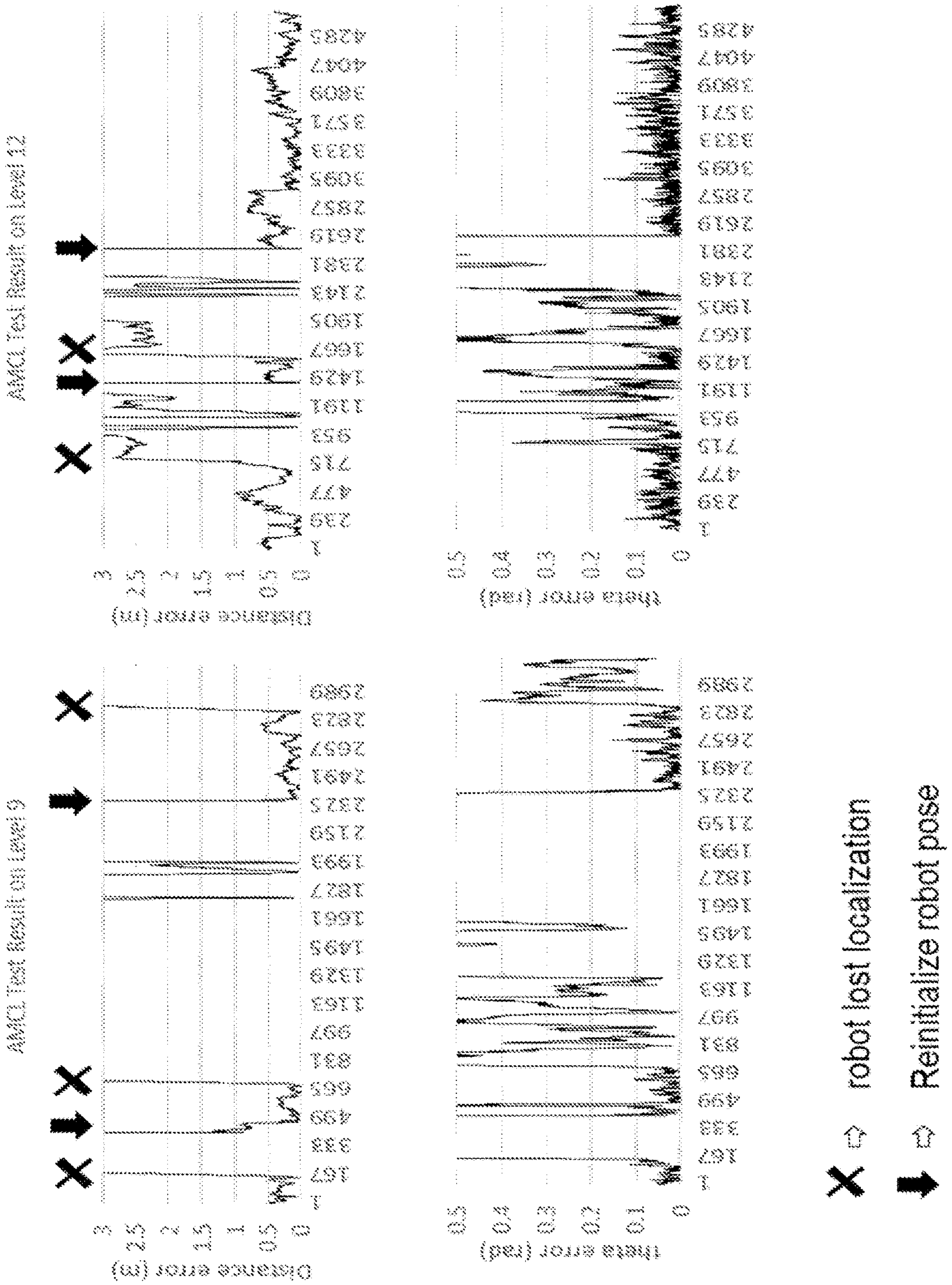
FIG. 14 illustrates errors of localisation using AMCL for comparing with the method of FIG. 3.

An experiment was also conducted on using AMCL directly using the floor plan 136 as grid map on level 9 and level 12 of the office building. During the experiment, the AMCL approach failed to localise the robot 100 when the robot 100 entered high discrepancy regions 276. The robot 100 drifted away from the true pose and could not recover its pose until the pose on the floor plan 136 is reinitialized. FIG. 14 illustrates distance errors and angle errors of localisation of the robot 100 on the floor plan 136 using AMCL. In FIG. 14, each cross sign represents the time line that the robot 100 started to lose track, and each arrow sign represents a re-initialisation of pose of the robot 100. As can be seen from FIG. 14, the robot 100 lost localisation due to significant errors of localisation, and required re-initialisation to complete travelling tasks on both level 9 and level 12. The errors of localisation using the PSLAM method illustrated in FIG. 12 and FIG. 13 were generally significantly smaller than the errors of localisation using AMCL illustrated in FIG. 14. With significantly-reduced errors, localisations using the PSLAM method did not encounter significant failure based on the same floor plan of level 9 and level 12 of the office building, whether the number of frames being used for constructing map is 50, 100 or 150.

Figure 15:
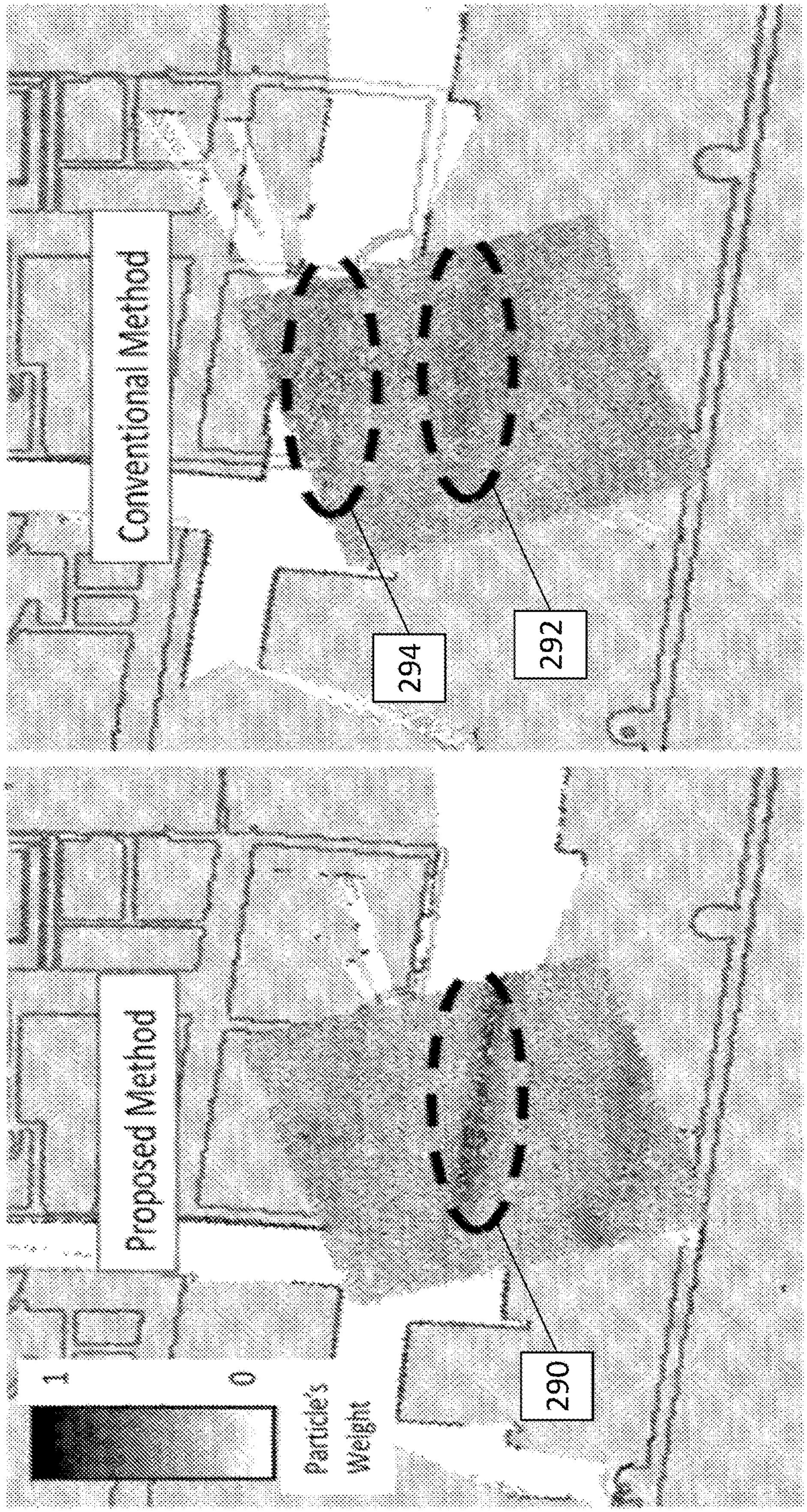
FIGS. 15(*a*)-(*b*) illustrate weight heat maps of particles for comparing a weighting method used in the method of FIG. 3 with a conventional weighting method.

Experiments were also carried out to compare the weight calculation method proposed in the present invention and a conventional method, using PSLAM as the input observation in the same pose, the results of which are illustrated in FIGS. 15(*a*) and 15(*b*) in the form of weight heat maps, where particles uniformly distribute around initialized pose and the darkness of a particle represents greatness of weight of the particle; for example, the darker the particle, the higher the weight of the particle, vice versa. FIG. 15(*a*) illustrates greatness of particle weights calculated using weight calculation proposed in the present invention that converts the floor plan 136 to the gradient direction map 160 and the gradient magnitude map 184 (e.g. pre-processing steps 230 and 232 in FIG. 8) and uses Equation (4) for calculating weights, wherein a circle 290 identifies a plurality of high-weight particles distributing around the true pose. FIG. 15(*b*) illustrates greatness of particle weights calculated using the conventional weighting method that uses the total number of cells that are occupied on the PSLAM map 158 to which corresponding floor plan's cells are occupied as well (i.e. sum of matched occupied cells, which is similar to the AMCL endpoint weighting method); wherein a circle 292 identifies a plurality of high-weight particles distributing around the true pose, while a circle 294 identifies a plurality of high-weight particles distributing around the wrong pose. FIGS. 15(*a*) and 15(*b*) show that the weighting method proposed in the present invention yielded high weight particles mainly focus on the area of true pose, whereas the conventional method yielded two similar high local maxima of high weight particle clusters, and the robot 100 selected the wrong cluster to localise itself at the circle 294. This illustrates that the weighting method proposed in the present invention successfully decreased the weights of the particles with the wrong matching of surface normal direction 162 of the floor plan 136, or from another perspective, successfully enhanced the weights of the particles with the correct matching of surface normal direction 162 of the floor plan 136.

As shown above, the proposed method demonstrates various advantages over the conventional methods. By constructing the PSLAM map 158 based on the current scan and the stored last N frames of historical scans, the accuracy of local consistency of the constructed PSLAM map 158 may be maintained at a level that supports continuous accurate localisation of the robot, and the PSLAM map may continue align the robot 100 in a region where the floor plan 136 comprises an inaccurate scale.

Further, the PSLAM proposed in this embodiment involves frontend scan-matching processes and may not require closed-loop backend processes. Utilizing scan-matching, it is possible to align a current scan to a previous map to maximize the likelihood of the current pose relative to the previous one. Since there may not be a need for the closed-loop process which might be useful for reducing accumulated error on full mapping, the proposed PSLAM may still be useful to create locally consistent maps, although less useful for globally consistent maps.

Also, since the proposed PSLAM may store only the last N frames of historical scans when constructing its map, older frames may drop off when there are more than N of historical frames. This effect is similar to moving windows, and is useful to keep the locally consistent map accurate, and accumulated errors on mapping would not be large. These may help to reduce computational power compared to a pose-graph SLAM, due to a small number of historical frames being used and thus, may not require closed-loop adjustment.

Figure 16:
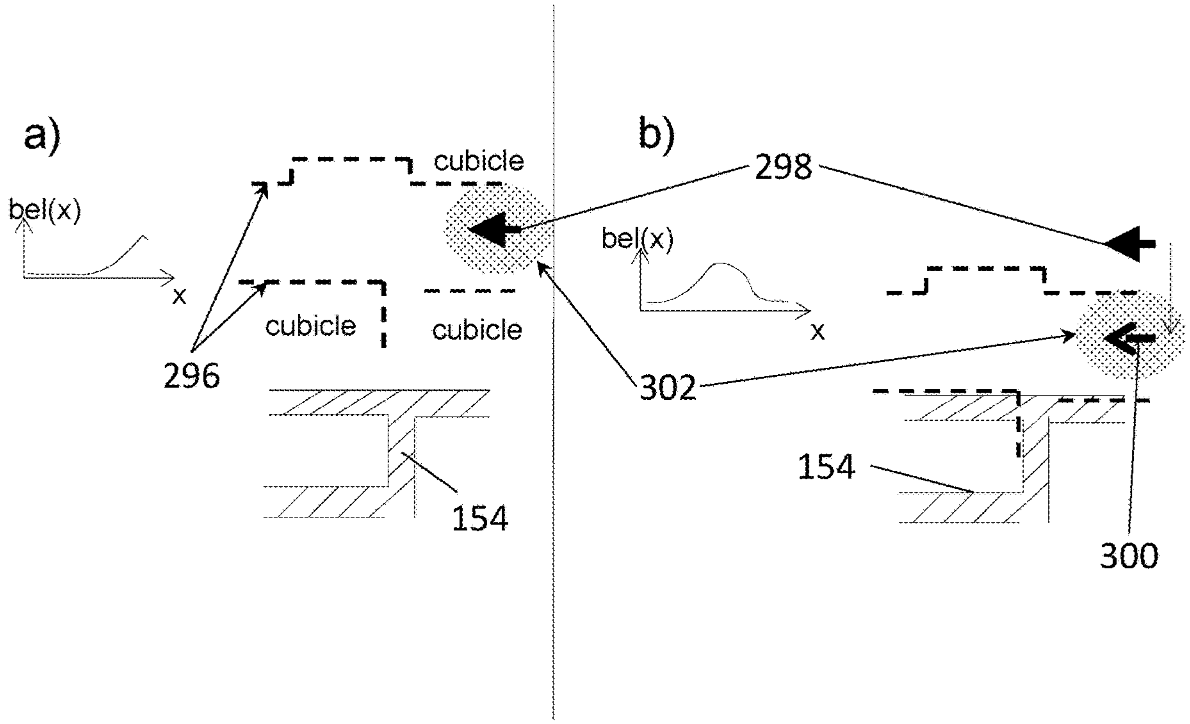
FIGS. 16(*a*)-(*b*) illustrate a no match scenario between scanning and floor plan that the method of FIG. 3 may help to tackle.

In view of the above, it is envisaged that the PSLAM method may be used to tackle a situation where LiDAR reading has no endpoint matching to permanent structure on the floor plan 136 when the robot 100 enters a zone where the walls are completely occluded by furniture, as illustrated in FIGS. 16(*a*) and 16(*b*). FIG. 16(*a*) shows that the LiDAR end points 296 do not match with the occupied cells 154 on the floor plan 136, so that particles that lie on or near the true pose 298 have low or no weight (see the horizon portion of the line chart in FIG. 16(*a*), which causes MCL to predict pose of the robot 100 away from the true pose 298. FIG. 16(*b*) shows the consequence of such issue that, the robot 100 drifts to the wrong pose 300 after several iterations to get more corresponding points from the floor plan's occupied cells 154. Assuming the real environment has a sparse low discrepancy region compared to the floor plan 136, the PSLAM method may be used to act as an extended LiDAR observation zone to keep track of low discrepancy regions using MCL and maintain the belief on a true pose when entering to a high discrepancy region.

Figure 17:
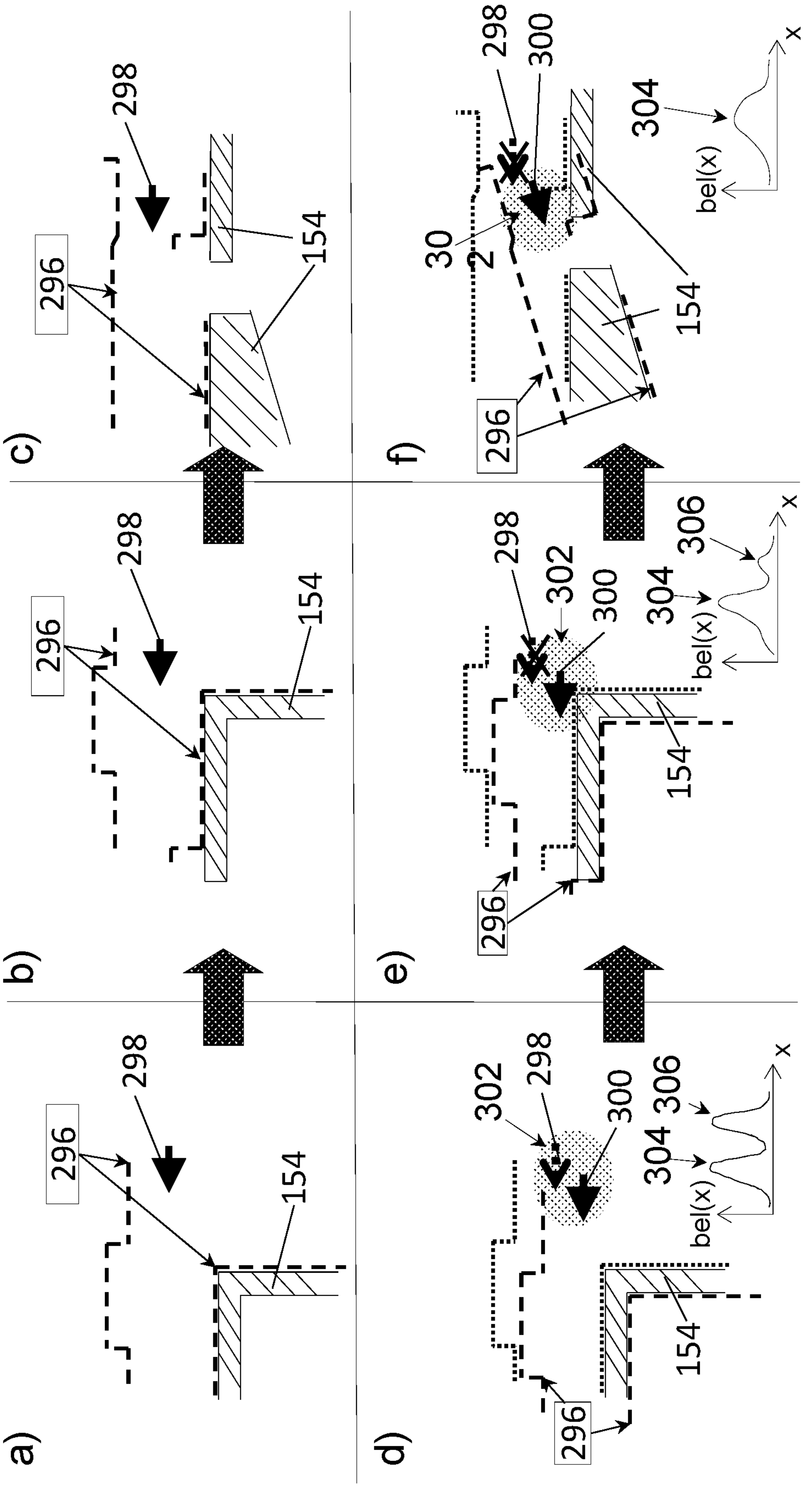
FIGS. 17(*a*)-(*f*) illustrate a general issue of using floor plan for localisation that the method of FIG. 3 may help to tackle.

The pre-processing of converting the floor plan 136 and the PSLAM map 158 to the gradient direction map 166 may be used to facilitate determining if a particle matches against the rear surface of the wall 142 in the floor plan 136, which may help to reduce weights of particles with the wrong matching of surface normal direction 162 and therefore may help to improve the accuracy of localisation. It is envisaged that, the PSLAM method may be used to tackle an issue that a localisation based on a floor plan may face: wall layout of the floor plan 136 may cause multiple local maxima due to that wall layout in the floor plan 136 shows two parallel lines of the occupied cells 154 representing the front and rear surfaces of the wall 142, where the front surface is visible by robot LiDAR's observation while the rear surface is not. FIGS. 17(*a*)-(*c*) show the sequence of true pose 298 of the robot 100 while the robot 100 is moving forward, where the LiDAR endpoints 296 lies on the floor plan's occupied cells 154 (the wall surface 170, not rear surface) and align correctly. Although all clusters are initially near to each other, the clusters may divert out after a few iterations while the robot 100 is moving. This may further cause wrong localisation when selecting the wrong cluster due to the wrong cluster may have a greater match as FIGS. 17(*d*)-(*f*) show, which is the same moving sequence as FIGS. 17(*a*)-(*c*) but the robot localised wrongly due to picking the wrong local maxima of the posterior cluster corresponding to the rear surface of the occupied cells 154 on the floor plan 136. The line chart of FIG. 17(*d*) illustrates two maxima due to that particle cloud 302 being separated into two clusters which indicate two poses, and the robot 100 picked the wrong local maxima 304 over the true local maxima 306 so that when the robot 100 is localised at the wrong pose 300 and the wrong local maxima 304 is enhanced when moving forward to the location in FIG. 17(*e*), due to which the robot continues to get the wrong pose 300 when moving forward further to the location in FIG. 17(*f*). Converting the floor plan 136 and the PSLAM map 158 to gradient direction maps may be helpful in aligning the LiDAR endpoints 296 correctly to the wall surface 170, not rear surface of the occupied cell 154.

Figure 18:
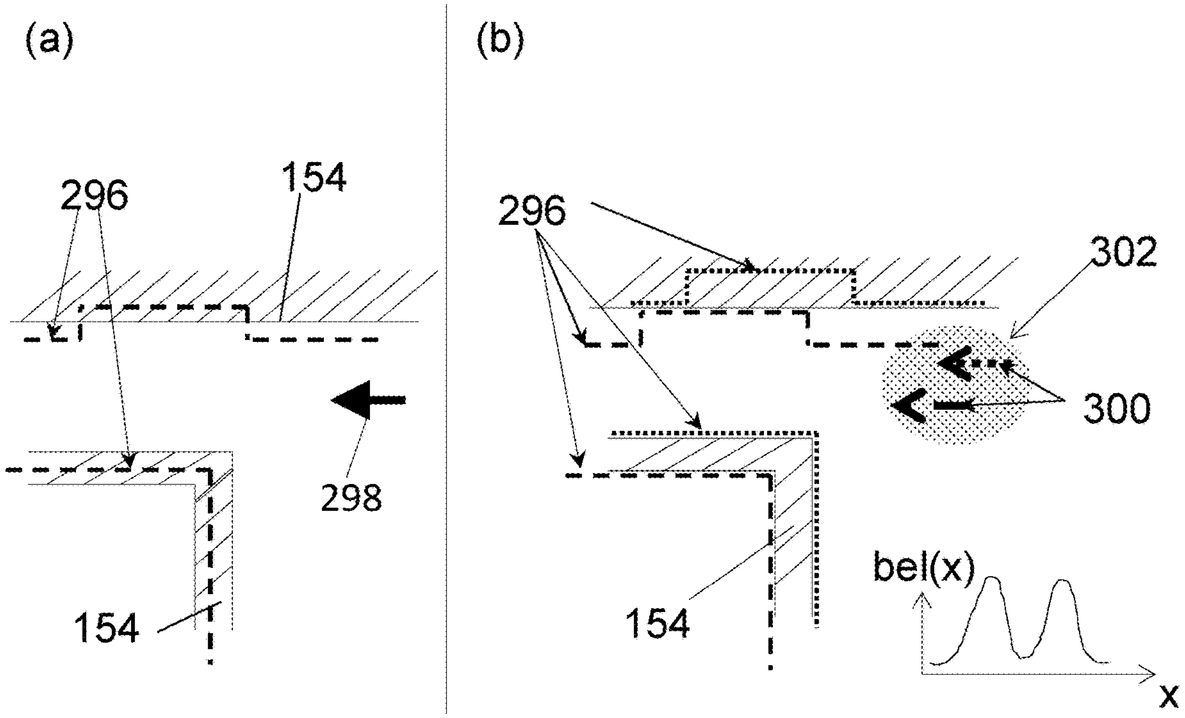
FIGS. 18(*a*)-(*b*) illustrate a potential issue of using floor plan for localisation that the method of FIG. 3 may help to tackle.

Diffusing the occupied cells 154 so that the centre of the diffused occupied cells 182 carries higher value which is lower when away from the centre, may be helpful in maintaining the accuracy of the localisation even in regions where the floor plan scale is slightly different from the real environment, such as the condition illustrated in FIGS. 18(*a*) and 18(*b*). In FIG. 18(*a*), the LiDAR endpoint 296 cannot associate to floor plan's occupied cell 154 when the robot 100 is at the correct pose 298. In FIG. 1(*b*), the robot 100 has two poses in the distribution area of particle cloud 302 that exhibit strong beliefs, both of which are wrong. Diffusing the occupied cells 154, may be helpful in avoiding particles forming multiple clusters when the robot 100 enters a region where the floor plan scale is slightly different from the real environment.

Overall, the approach combining PSLAM built map, MCL, gradient direction map and Gaussian grid map may help to tackle the issues of missing information in the floor plan 136. Further, with the ability to control the number of historical frames to be used to adapt to a large variety of buildings' floor plans, robustness of the proposed solution may be improved.

While the flow chart of FIG. 3 shows that there is an order of steps of the method of localising the robot 100, it is envisaged that the order of steps may be altered, for example, generating predicted pose 156 (step 124) and scanning the on-site reference features 186 (step 126) may be carried out concurrently or step 126 may come first.

While it is mentioned in the described embodiment that the robot 100 has wheels, it is envisaged that the robot 100 may be of any type that is able to move around, such as a robot equipped with legs, wings, propellers and/or balloon. It is also envisaged that one type of the robot 100 equipped with wheels is an autonomous vehicle (AV).

While the designated environment in the described embodiment is a building, it is envisaged that the method and system may be applied to outdoor scenarios as well, such as outdoor AVs and mobile platform applications.

While the sensor module 102 in the above described embodiment comprises the 2D LiDAR sensor 194, the odometer 196 and the steering angle sensor 198, it is envisaged that the sensor module 102 may comprise other sensors that may help to detect reference features of an environment and/or detect movement information of the robot 100, such as a 3D LiDAR sensor, a RADAR sensor, an ultrasonic sensor, speedometer, etc. Further, while steering angle sensor 198 is used to detect travelled angle of the robot 100, it is envisaged that the angle can be obtained from the odom or from any steering measure sensors like IMU etc.

While particle filter based MCL is used for localising the pose of the robot 100 in the described embodiment and examples, it is envisaged that other filter algorithms may be used, such as Kalman filters, histogram filters, Kullback-leibler Divergence (KLD) sampling based MCL, Iterative Closet Point based (ICP) method, Template Matching based method, and grid localisation etc.

While in the examples of implementation, the pre-processing stage comprises pre-processing steps carried out before the start of MCL algorithm, it is envisaged that one or more pre-processing steps may be carried out concurrently with or after some steps of the MCL algorithm. For example, the floor plan 136 may be converted to the gradient direction map 160 and the gradient magnitude map 184 first, and then the PSLAM map 158 may be converted to gradient direction map 166 before the update of weight starts.

While in the examples of implementation, the earliest frame exceeding N is deleted, it is envisaged that the frames may not be necessarily deleted from all mediums, for example, the frames may be deleted from the robot hardware, but before the deletion, the frames may be sent to a server (e.g. at cloud).

While the floor plan is converted to the gradient direction map 160 and/or the gradient magnitude map 184, it is envisaged that other algorithms or tools may be used to identify the reference features (such as the surface normal, distribution of occupied cells) from the floor plan. For example, for detecting the normal of a line, methods that may be used to detect the direction of the line may be used as the direction of the line is perpendicular to the normal of the line, such as line segmentation, phase portrait model, etc.; for distribution of occupied cells, morphological operation "dilate" may be used.

While in the described embodiment, grid map is used. It is envisaged that other types of map that is able to represent information of the map appropriately, such as vector maps (e.g. SVG).

While the localisation system 104 is shown as a separate module in FIG. 1, it is envisaged that the localisation system 104 may form part of the controller 106.

Having now described the invention, it should be apparent to one of ordinary skill in the art that many modifications can be made hereto without departing from the scope as claimed.

The invention claimed is:

1. A method of localising a robot using a scale plan of a designated environment, the robot comprising a controller configured to control movement of the robot, a sensor module configured to detect on-site reference features and a processor, the method comprising:

identifying, by the processor, reference features from the scale plan;

generating, by the processor, a predicted pose of the robot's current location on the scale plan based on the identified reference features;

scanning, by the sensor module, on-site reference features of the current location;

generating, by the processor, a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features;

converting, by the processor, the scale plan to a first gradient direction map and the generated map to a second gradient direction map for calculating a weight for the predicted pose, wherein the first gradient direction map includes a first gradient direction representing a respective reference normal direction of surface to each reference feature identified on the scale plan and the second gradient direction map includes a second gradient direction representing a respective on-site normal direction of a surface to each on-site reference feature scanned at the current location; and controlling, by the processor, the controller to cause movement of the robot in the designated environment based on the generated map.

2. The method according to claim 1, further comprising updating the predicted pose of the robot on the scale plan based on the calculated weight.

3. The method according to claim 1, further comprising converting the scale plan to a gradient magnitude map for calculating the weight for the predicted pose, wherein the gradient magnitude map includes a gradient of magnitude representing a respective distribution for each reference feature identified on the scale plan, with a centre of each identified reference feature carrying a higher magnitude value than an edge of the respective identified reference feature.

4. The method according to claim 3, wherein the predicted pose comprises a plurality of particles, each representing a potential location of the robot associated with a respective particle weight, wherein the particle weight for at least one of the plurality of particles is calculated to be proportional to the magnitude value of a corresponding cell in the gradient magnitude map.

5. The method according to claim 4, wherein calculating the weight for the predicted pose comprising calculating the particle weight for each of the plurality of particles.

6. The method according to claim 4, wherein the generated map comprises a sensed pose of the robot and the scanned on-site reference features of the current location comprise a fixed or immovable object of the designated environment, the particle weight for at least one of the plurality of particles is calculated to be inverse proportional to a distance between the sensed pose and the fixed or immovable object.

7. The method according to claim 1, wherein the scanned on-site reference features of the current location is stored as a latest frame of historical scans for generating the map when the robot traverses to a next location from the current location.

8. The method according to claim 1, wherein two neighbouring frames of the last N frames of historical scans share an overlap of on-site reference features.

9. A system for localising a robot using a scale plan of a designated environment, comprising:

i. a sensor module, configured to detect on-site reference features;

ii. a controller, configured to control movement of the robot; and iii. a processor, configured to:
identify reference features from the scale plan;
generate a predicted pose of the robot's current location on the scale plan based on the identified reference features;
scan on-site reference features of the current location;
generate a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features;
convert the scale plan to a first gradient direction map and the generated map to a second gradient direction map for calculating a weight for the predicted pose, wherein the first gradient direction map includes a first gradient direction representing a respective reference normal direction of surface to each reference feature identified on the scale plan and the second gradient direction map includes a second gradient direction representing a respective on-site normal direction of a surface to each on-site reference feature scanned at the current location; and
control the controller to cause movement of the robot in the designated environment based on the generated map.

10. The system according to claim 9, the processor is configured to:
update the predicted pose of the robot on the scale plan based on the calculated weight.

11. The system according to claim 9, the processor is configured to further convert the scale plan to a gradient magnitude map for calculating the weight for the predicted pose, wherein the gradient magnitude map includes a gradient of magnitude representing a respective distribution for each reference feature identified on the scale plan, with a centre of each identified reference feature carrying a higher magnitude value than an edge of the respective identified reference feature.

12. The system according to claim 11, wherein the predicted pose comprises a plurality of particles, each representing a potential location of the robot associated with a respective particle weight.

13. The system according to claim 12, wherein calculating the weight for the predicted pose comprising calculating the particle weight for each of the plurality of particles.

14. The system according to claim 12, wherein the particle weight for at least one of the plurality of particles is calculated to be proportional to the magnitude value of a corresponding cell in the gradient magnitude map.

15. The system according to claim 12, wherein the generated map comprises a sensed pose of the robot and the scanned on-site reference features of the current location comprise a fixed or immovable object of the designated environment, the particle weight for at least one of the plurality of particles is calculated to be inverse proportional to a distance between the sensed pose and the fixed or immovable object.

16. The system according to claim 9, wherein the processor stores the scanned on-site reference features of the current location as a latest frame of historical scans for generating the map when the robot traverses to a next location from the current location.

17. The system according to claim 9, wherein two neighbouring frames of the last N frames of historical scans share an overlap of on-site reference features.

18. A robot, comprising:
a system according to claim 9.

19. A method of localising a robot using a scale plan of a designated environment, the robot comprising a controller configured to control movement of the robot, a sensor module configured to detect on-site reference features and a processor, the method comprising:
identifying, by the processor, reference features from the scale plan;
generating, by the processor, a predicted pose of the robot's current location on the scale plan based on the identified reference features;
scanning, by the sensor module, on-site reference features of the current location;
generating, by the processor, a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features;
converting, by the processor, the scale plan to a gradient magnitude map for calculating a weight for the predicted pose, wherein the gradient magnitude map includes a gradient of magnitude representing a respective distribution for each reference feature identified on the scale plan, with a centre of each identified reference feature carrying a higher magnitude value than an edge of the respective identified reference feature; and
controlling, by the processor, the controller to cause movement of the robot in the designated environment based on the generated map.

20. A system for localising a robot using a scale plan of a designated environment, comprising:
i. a sensor module, configured to detect on-site reference features;
ii. a controller, configured to control movement of the robot; and
iii. a processor, configured to:
identify reference features from the scale plan;
generate a predicted pose of the robot's current location on the scale plan based on the identified reference features;
scan on-site reference features of the current location;
generate a map for the current location to localise the robot, based on the scanned on-site reference features of the current location and last N frames of historical scans of previous on-site reference features of a plurality of locations in the designated environment that the robot traversed through before reaching the current location; the last N frames being fewer than total frames of the historical scans of the previous on-site reference features;
convert the scale plan to a gradient magnitude map for calculating a weight for the predicted pose, wherein the gradient magnitude map includes a gradient of magnitude representing a respective distribution for each reference feature identified on the scale plan, with a centre of each identified reference feature carrying a higher magnitude value than an edge of the respective identified reference feature; and control the controller to cause movement of the robot in the designated environment based on the generated map.

* * * * *